United States Patent
Moran et al.

(10) Patent No.: US 9,538,250 B2
(45) Date of Patent: Jan. 3, 2017

(54) METHODS AND SYSTEMS FOR CREATING AND MANAGING MULTI PARTICIPANT SESSIONS

(71) Applicant: Comigo Ltd., Moshav Yarkona (IL)

(72) Inventors: Dov Moran, Kfar Saba (IL); Motty Lentzitzky, RaAnana (IL); Mordechai Teicher, Hod-HaSharon (IL)

(73) Assignee: Comigo Ltd., Moshav Yarkona (IL)

( * ) Notice: Subject to any disclaimer, the term of this patent is extended or adjusted under 35 U.S.C. 154(b) by 0 days.

(21) Appl. No.: 14/582,226

(22) Filed: Dec. 24, 2014

(65) Prior Publication Data

US 2015/0172338 A1 Jun. 18, 2015

Related U.S. Application Data

(62) Division of application No. 14/239,152, filed as application No. PCT/IB2012/054016 on Aug. 6, 2012.

(Continued)

(51) Int. Cl.
*H04L 29/06* (2006.01)
*H04N 21/4722* (2011.01)
(Continued)

(52) U.S. Cl.
CPC ...... *H04N 21/4788* (2013.01); *G06F 3/04817* (2013.01); *G06F 3/04842* (2013.01);
(Continued)

(58) Field of Classification Search
CPC ............. H04N 21/44218; H04N 21/4788; H04N 21/42201; H04N 21/4722; H04N 21/42204; H04N 21/4627; H04N 21/472; H04N 21/482; H04N 21/4758; H04N 21/4886; H04N 21/41407; H04N 21/42208; H04N 21/23418; H04N 21/25891; H04N 21/4312; H04N 21/4668; H04N 21/478; H04N 21/8545; H04N 21/2393; H04N 21/64784; H04N 21/632; H04N 21/8173; H04N 21/42202; H04N 21/44203; H04N 21/4223; H04N 21/4786; H04L 64/4076; H04L 51/36; H04L 67/104; H04L 65/403; G06F 3/0481; G06F 3/0484; G06F 3/04817; G06F 3/04842; H04M 3/567

See application file for complete search history.

(56) References Cited

U.S. PATENT DOCUMENTS 7,920,158 B1 * 4/2011 Beck .................. H04N 5/23219
348/14.08
2001/0047518 A1 11/2001 Sahota et al.
(Continued)

FOREIGN PATENT DOCUMENTS

EP 1225763 7/2002
WO WO 2013/024397 2/2013

OTHER PUBLICATIONS

Official Action Dated Jun. 30, 2015 From the US Patent and Trademark Office Re. U.S. Appl. No. 14/580,251.
(Continued)

*Primary Examiner* — Benjamin R Bruckart
*Assistant Examiner* — Carmine Malangone

(57) ABSTRACT

A method of creating a multi participant session among a plurality of viewers of media content. The method comprises automatically identifying which media content is currently presented on a plurality of client terminals of a plurality of subscribers, receiving, from a first subscriber, a first selection indicative of a template of a multi participant session object and a second selection indicative of a group from the plurality of subscribers, creating a multi participant session object adapted for simultaneous presentation with the media content according to first and second selections and establishing a multi participant session among at least one member of the group and the first subscriber using the multi participant session object.

13 Claims, 8 Drawing Sheets

Related U.S. Application Data

(60) Provisional application No. 61/559,166, filed on Nov. 14, 2011, provisional application No. 61/538,876, filed on Sep. 25, 2011, provisional application No. 61/523,413, filed on Aug. 15, 2011.

(51) Int. Cl.

| | | |
|---|---|---|
| *G06F 3/0484* | (2013.01) | |
| *G06K 9/00* | (2006.01) | |
| *H04N 7/15* | (2006.01) | |
| *H04N 21/4788* | (2011.01) | |
| *H04N 21/4786* | (2011.01) | |
| *H04N 21/422* | (2011.01) | |
| *H04M 3/56* | (2006.01) | |
| *H04N 21/63* | (2011.01) | |
| *H04N 21/442* | (2011.01) | |
| *H04N 21/4627* | (2011.01) | |
| *H04N 21/472* | (2011.01) | |
| *H04N 21/482* | (2011.01) | |
| *H04L 12/58* | (2006.01) | |
| *H04N 21/414* | (2011.01) | |
| *G06F 3/0481* | (2013.01) | |
| *H04N 21/475* | (2011.01) | |
| *H04N 21/488* | (2011.01) | |
| *H04N 21/234* | (2011.01) | |
| *H04N 21/258* | (2011.01) | |
| *H04N 21/431* | (2011.01) | |
| *H04N 21/466* | (2011.01) | |
| *H04N 21/478* | (2011.01) | |
| *H04N 21/8545* | (2011.01) | |
| *H04L 29/08* | (2006.01) | |
| *H04N 21/239* | (2011.01) | |
| *H04N 21/647* | (2011.01) | |
| *H04N 21/81* | (2011.01) | |
| *H04N 21/84* | (2011.01) | |
| *H04N 21/235* | (2011.01) | |
| *H04N 21/278* | (2011.01) | |
| *H04N 21/433* | (2011.01) | |

(52) U.S. Cl.
CPC ............ *H04L 51/046* (2013.01); *H04L 51/36* (2013.01); *H04L 65/403* (2013.01); *H04L 65/4076* (2013.01); *H04L 67/104* (2013.01); *H04L 67/141* (2013.01); *H04M 3/567* (2013.01); *H04N 7/15* (2013.01); *H04N 21/235* (2013.01); *H04N 21/2393* (2013.01); *H04N 21/23418* (2013.01); *H04N 21/25891* (2013.01); *H04N 21/278* (2013.01); *H04N 21/41407* (2013.01); *H04N 21/42201* (2013.01); *H04N 21/42202* (2013.01); *H04N 21/42203* (2013.01); *H04N 21/42204* (2013.01); *H04N 21/42208* (2013.01); *H04N 21/4312* (2013.01); *H04N 21/4334* (2013.01); *H04N 21/44218* (2013.01); *H04N 21/44222* (2013.01); *H04N 21/4627* (2013.01); *H04N 21/4668* (2013.01); *H04N 21/472* (2013.01); *H04N 21/478* (2013.01); *H04N 21/4722* (2013.01); *H04N 21/4758* (2013.01); *H04N 21/4786* (2013.01); *H04N 21/47202* (2013.01); *H04N 21/482* (2013.01); *H04N 21/4886* (2013.01); *H04N 21/632* (2013.01); *H04N 21/64784* (2013.01); *H04N 21/8173* (2013.01); *H04N 21/84* (2013.01); *H04N 21/8545* (2013.01)

(56) References Cited

U.S. PATENT DOCUMENTS

| | | |
|---|---|---|
| 2002/0152463 A1 | 10/2002 | Dudkiewicz |
| 2002/0184634 A1 | 12/2002 | Cooper |
| 2005/0129230 A1 | 6/2005 | Mihota |
| 2005/0281531 A1* | 12/2005 | Unmehopa ............... 386/46 |
| 2006/0031291 A1* | 2/2006 | Beckemeyer .......... G06Q 10/10 709/204 |
| 2006/0271953 A1 | 11/2006 | Jacoby et al. |
| 2007/0010330 A1 | 1/2007 | Cooper et al. |
| 2007/0061851 A1* | 3/2007 | Deshpande et al. ............ 725/88 |
| 2007/0118586 A1 | 5/2007 | Hwang et al. |
| 2007/0220010 A1* | 9/2007 | Ertugrul ................. G06Q 30/02 |
| 2007/0280638 A1 | 12/2007 | Aoki et al. |
| 2008/0013802 A1* | 1/2008 | Lee et al. ..................... 382/118 |
| 2008/0089551 A1 | 4/2008 | Heather et al. |
| 2008/0092171 A1 | 4/2008 | Roberts et al. |
| 2009/0100497 A1 | 4/2009 | Goldberg et al. |
| 2009/0133081 A1 | 5/2009 | Sakai et al. |
| 2009/0169171 A1* | 7/2009 | Massey et al. ................. 386/68 |
| 2009/0293079 A1 | 11/2009 | McKee et al. |
| 2009/0319901 A1 | 12/2009 | Johnson et al. |
| 2010/0245536 A1* | 9/2010 | Huitema et al. ........... 348/14.08 |
| 2010/0306708 A1 | 12/2010 | Trenz et al. |
| 2011/0052144 A1 | 3/2011 | Abbas et al. |
| 2011/0126258 A1 | 5/2011 | Emerson et al. |
| 2011/0173300 A1 | 7/2011 | Levy et al. |
| 2012/0131110 A1* | 5/2012 | Buyukkoc et al. ........... 709/206 |
| 2012/0159327 A1 | 6/2012 | Law et al. |
| 2012/0174157 A1 | 7/2012 | Stinson, III et al. |
| 2014/0223464 A1 | 8/2014 | Moran et al. |
| 2015/0106858 A1 | 4/2015 | Moran et al. |
| 2015/0143422 A1 | 5/2015 | Moran et al. |
| 2015/0156550 A1 | 6/2015 | Moran et al. |
| 2015/0163191 A1 | 6/2015 | Moran et al. |
| 2015/0163553 A1 | 6/2015 | Moran et al. |
| 2015/0169184 A1 | 6/2015 | Moran et al. |
| 2015/0172337 A1 | 6/2015 | Moran et al. |
| 2015/0172388 A1 | 6/2015 | Moran et al. |
| 2015/0172768 A1 | 6/2015 | Moran et al. |

OTHER PUBLICATIONS

Official Action Dated Jul. 1, 2015 From the US Patent and Trademark Office Re. U.S. Appl. No. 14/578,541.
Official Action Dated Jul. 9, 201 From the US Patent and Trademark Office Re. U.S. Appl. No. 14/580,255.
Official Action Dated Jul. 9, 2015 From the US Patent and Trademark Office Re. U.S. Appl. No. 14/578,589.
Official Action Dated Jul. 10, 2015 From the US Patent and Trademark Office Re. U.S. Appl. No. 14/582,224.
Official Action Dated Jul. 13, 2015 From the US Patent and Trademark Office Re. U.S. Appl. No. 14/571,381.
Official Action Dated Jun. 8, 2015 From the US Patent and Trademark Office Re. U.S. Appl. No. 14/571,406.
Official Action Dated Jun. 8, 2015 From the US Patent and Trademark Office Re. U.S. Appl. No. 14/580,270.
International Preliminary Report on Patentability Dated Feb. 27, 2014 From the International Bureau of WIPO Re. Application No. PCT/IB2012/054016.
International Search Report and the Written Opinion Dated Feb. 3, 2013 From the International Searching Authority Re. Application No. PCT/IB2012/054016.
Supplementary European Search Report and the European Search Opinion Dated Feb. 26, 2015 From the European Patent Office Re. Application No. 12824321.9.

* cited by examiner

METHODS AND SYSTEMS FOR CREATING AND MANAGING MULTI PARTICIPANT SESSIONS

RELATED APPLICATIONS

This application is a division of U.S. patent application Ser. No. 14/239,152 filed on Feb. 17, 2014, which is a National Phase of PCT Patent Application No. PCT/IB2012/054016 having International filing date of Aug. 6, 2012, which claims the benefit of priority under 35 USC §119(e) of U.S. Provisional Patent Application Nos. 61/559,166 filed on Nov. 14, 2011, 61/538,876 filed on Sep. 25, 2011 and 61/523,413 filed on Aug. 15, 2011. The contents of the above applications are all incorporated by reference as if fully set forth herein in their entirety.

FIELD AND BACKGROUND

The present disclosure, in some embodiments thereof, relates to methods and systems of communication and, more particularly, but not exclusively, to methods and systems for enabling and enriching communication between television viewers, for example, through the creation of multi participant sessions, interactive content presentation, and video chat.

People socialize within a shared social space. Often this socialization occurs in the context of listening to music, watching a television program, or watching a movie within the home. The fellowship engendered by this experience changes when some of the members of the social group move away or otherwise become remote from the heart of the group.

During the last few years, various developments have been made to provide television (TV) services that socially connect between users that watch a common video content in different location. For example, services have recently been proposed in which users can store, share and discover bookmarks that point to multimedia clips taken from television and other video programming. The bookmarks, which can be created and shared through a user's set top box or other client device, are analogous to web-based social bookmarks that are offered by on-line services such as del.icio.us, for example. Such social TV services allow users to share clips from programs with friends and tag bookmarks for easy access. Users gain information on what friends are interested in and the producers of the tagged or bookmarked programs gain information about their viewers.

Another example is Chatter application program of Splashcast™ and Hulu™ that allows social network users to add comments to video content which is available at Hulu's website. This program allows social network users to comment about a show via micro comments which are synced to a video file or a stream. In this program user micro comments can be seen by future users that will access the video file or stream.

Another solution is described in U.S. Patent Application No. 2007/0280638 that teaches a system (such as an extension to a social television system) that extracts and stores content and/or commentary from an experiential data stream as a presentation for later playback. The presentation can be given to another to share the experience of viewing the experiential data stream with the creator of the presentation. The presentation can be read and processed by any standard playback device (such as a DVD player, an MP3 player, a tape player etc.). The presentation is predefined and constrained to enable it to be used by commonly used playback devices. In the context of a social television system the disclosed technology provides a way for people to interact naturally while watching a TV program and to share their reactions asynchronously, and later obtaining responses in context from people watching at different times.

Interactive television (TV) has already been deployed in various forms. The electronic program guide (EPG) is one example, where the TV viewer is able to use the remote control to control the display of programming information such as TV show start times and duration, as well as brief synopses of TV shows. The viewer can navigate around the EPG, sorting the listings, or selecting a specific show or genre of shows to watch or tune to at a later time.

Another example is the WebTV interactive system produced by Microsoft, wherein web links, information about the show or story, shopping links, and so on are transmitted to the client terminal through the vertical blanking interval of the TV signal. Other examples of interactive TV include television delivered via the internet protocol (IP) to a personal computer (PC), where true interactivity can be provided, but typically only a subset of full interactivity is implemented. For the purposes of this patent application, full interactivity is defined as fully customizable screens and options that are integrated with the original television display, with interactive content being updated on the fly based on viewer preferences, demographics, other similar viewer's interactions, and the programming content being viewed. The user interface for such a fully interactive system should also be completely flexible and customizable.

During the last years various technologies for the reception and transmission of audio-video signals by users at different locations, for communication between people in real-time have been developed.

These technologies have been integrated into various operating systems and browsers for usage on different client terminals, such as cellular phones, tablets, laptops, and Internet Protocol television (IPTV).

For example, U.S. Patent Application Pub. No. 2011/0173300 describes techniques for a protocol that provides for a TV viewing experience with interaction by allowing for social collaboration of non-co-located TV viewers and integrating the TV viewing experience with social networking concepts and interactive multimedia communication. The protocol enables a digital video distribution system (e.g., IPTV) to provide a user with presence, channel, and grouping information regarding other users in the IPTV system and available video content. The protocol also enables users of the IPTV system to interact using real-time and/or non-real time communication.

SUMMARY OF THE DISCLOSURE

According to some embodiments of the present disclosure, there is provided a method of creating a multi participant session among a plurality of viewers of media content. The method comprises automatically identifying which media content is currently presented on a plurality of client terminals of a plurality of subscribers, receiving, from a first of the plurality of subscribers, a first selection indicative of a template of a multi participant session object and a second selection indicative of a group from the plurality of subscribers, creating a multi participant session object adapted for simultaneous presentation with the media content according to the first and second selections, and establishing a multi participant session among at least one member of the group and the first subscriber using the multi participant session object.

Optionally, the method further comprises forwarding a message indicative of the media content to a social network provider to update a respective user profile accordingly.

Optionally, the establishing comprises generating an interactive user interface according to the multi participant session object and selecting at least some of the plurality of client terminals to present the interactive user interface.

Optionally, the method further comprises forwarding the interactive user interface to a remote controlling device via one of the plurality of client terminals and presenting the interactive user interface on a display of the remote controlling device.

Optionally, the method further comprises updating the multi participant session object according to a plurality of user inputs from the at least some client terminals.

Optionally, the method further comprises generating a plurality of interactive user interfaces, each designated to another of the plurality of subscribers, according to the multi participant session object and forwarding each the interactive user interface to another of a plurality of remote controlling devices via one of the plurality of client terminals to present the plurality of interactive user interfaces on displays of the plurality of remote controlling devices simultaneously.

Optionally, the creating comprises sending to each member of the group an invitation to watch the media content in parallel to a participation in the multi participant session.

Optionally, the method further comprises presenting a plurality of templates of multi participant session objects to the first subscriber to facilitate the first selection; wherein the plurality of templates are selected from a template repository.

Optionally, the method further comprises updating the template repository with a new template based on the multi participant session object.

More optionally, the plurality of templates are selected according to at least one characteristic of the first subscriber.

More optionally, the plurality of templates are selected according to at least one characteristic of at least one member of the group.

More optionally, the plurality of templates are selected according to at least one characteristic of at least one subscriber of the plurality of subscribers which is socially connected to the first subscriber.

Optionally, the method further comprises automatically generating at least some of the plurality of templates according an analysis of at least one electronic program guides (EPG).

More optionally, the plurality of templates are selected according to at least one characteristic of the media content.

Optionally, the multi participant session is a social interactive activity selected from a group consisting of a poll, a chat, a game, a gambling mechanism, a quiz.

More optionally, the creating comprises receiving user content from the subscriber and creating the multi participant session object so as to present the user content on the interactive user interface as at least one of a question, a bid, and a set of possible answers to a question.

Optionally, the creating comprises identifying at least one characteristic of the media content and creating the multi participant session object to match the media content.

Optionally, the creating comprises identifying at least one characteristic of a member of the group and creating the multi participant session according to the at least one characteristic.

Optionally, the method further comprises identifying at least one of the plurality of subscribers which is socially connected to the first subscriber and presenting the at least one subscriber to the first subscriber to facilitate the second selection.

Optionally, the media content is a broadcast presented on the at least some client terminals.

Optionally, the media content is video on demand (VOD) content selected by the first subscriber.

Optionally, the media content is locally stored on a respective aid client terminal or a memory device connected thereto.

Optionally, the method further comprises capturing a plurality of images of each member of the group and of the first subscriber during the multi participant session, the updating comprises presenting the plurality of images using a respective the interactive user interface on the plurality of client terminals.

More optionally, the updating comprises presenting promotional content using a respective the interactive user interface on the plurality of client terminals.

More optionally, the method further comprises selecting the promotional content based on analysis of a member from a group consisting of the number of members in the group, a characteristic of the media content, and a characteristic of at least one member of the group.

More optionally, the method further comprises selecting the promotional content according to a combination of characteristics of a plurality of members of the group.

Optionally, the method further comprises receiving, from the first subscriber, a request to fund at least one right to access the media content and billing the first subscriber for a usage of the at least one right to access the media content by at least one member of the group.

Optionally, the method further comprises establishing a plurality of sub multi participant session subscribers among sub groups of the group.

According to other embodiments of the disclosure a method is taught for selecting at least one interactive application for presentation. The method may comprise: identifying a plurality of interactive applications which are available for presentation on a client terminal of a user; automatically identifying a media content item being currently presented on the client terminal; automatically identifying at least one media content characteristic of the media content; selecting a group of the plurality of interactive applications which are tagged as suitable for media content having the at least one media content characteristic; and presenting members of the group on a display of the client terminal in relation to the media content item.

Optionally, the plurality of interactive applications are locally stored on the client terminal.

Optionally, the plurality of interactive applications comprises a record defining at least one suitable media content characteristic.

Optionally, at least one media content characteristic comprises at least one member of a group consisting of: a genre, a length, a rating, an age rating, a language, an origin country, a production source, a production date, indirect advertising content and/or the like.

Optionally, the automatically identifying at least one content characteristic comprises acquiring the at least one content characteristic via a network from a database storing a plurality of media content records each having a respective the at least one content characteristic.

Optionally, the media content item is a broadcasted content, the automatically identifying a media content item comprises detecting a currently presented channel on the client terminal and analyzing at least one electronic program guide (EPG) to identify currently aired media content on the currently presented channel.

Optionally, the media content item is a video on demand (VOD) item, the automatically identifying a media content item comprises detecting requesting the at least one media content characteristic from the source of the VOD item.

Optionally, automatically identifying a media content item comprises identifying a currently presented scene of the media content item; wherein the automatically identifying at least one media content characteristic of the media comprises automatically identifying at least one scene characteristic; wherein members of the group are tagged as suitable for a scene having the at least one scene characteristic and the presenting being performed in relation to the scene.

Optionally, each the plurality of interactive applications is associated with at least one suitable media content characteristic; the selecting comprises matching between the at least one suitable media content characteristic of at least some of the plurality of interactive applications and the at least one media content characteristic.

Optionally, the selecting comprises matching the at least one media content characteristic with records of a dataset documenting at least one suitable media content characteristic per each the interactive application.

Optionally the method further comprises allowing a plurality of users to perform at least one of tagging the plurality of interactive applications and updating a database storing a plurality of media content records about a plurality of media content items.

Optionally, the selecting comprises identifying which media content item is currently watched by at least one friend of the user and selecting the group according thereto.

Optionally the method further comprises automatically identifying a new media content item that is currently presented on the client terminal, automatically identifying at least one new media content characteristic of the new media content, selecting a new group of the plurality of interactive applications which are tagged as suitable for media content having the at least one new media content characteristic, and presenting members of the new group on a display of the client terminal in relation to the new media content item.

Optionally the method further comprises detecting at least one current viewing pattern on the client terminal and selecting an additional group of the plurality of interactive applications which are tagged as suitable for the viewing pattern; wherein the presenting comprises presenting members of the additional group on the display.

Optionally, the at least one current viewing pattern is selected from a group consisting of: the period the user watches the media content item, at least one additional media content previously watched by the user, a frequency of recent zapping by the user, a volume level at which the media content item being played, a display setting at which the media content item being played, and current time.

Optionally, the plurality of interactive applications are stored on the client terminal.

Optionally, the plurality of interactive applications are stored on a remote terminal.

Optionally, the plurality of interactive applications include commercial applications which contain a commercial content.

Another aspect of the disclosure is to present a computer readable medium comprising computer executable instructions adapted to perform a method such as described herein.

According to another embodiment of the disclosure, a system is introduced for selecting at least one interactive application for presentation. The system may comprise a database of a plurality of media content records each indicative of at least one media content characteristic of one of a plurality of media content items; a central unit which receives a request with an identifier of media content presented by a client terminal and forwards respective the at least one media content characteristic from the plurality of media content records in response to the request; a client module hosted by the client terminal and manages a plurality of applications which are available for use on the client terminal, the client module receives the at least one media content characteristic, selects accordingly a group from the plurality of applications, and presents the group to a user of the client terminal.

Optionally, the system further comprises an updating module which analyzes a plurality of web pages to extract respective the at least one media content characteristic for at least one of updating the plurality of media content records and adding a plurality of new media content records.

Still another aspect of the disclosure is to teach a method of selecting at least one interactive application for presentation, comprising: identifying a plurality of interactive applications which are available for presentation on a client terminal of a user; extracting metadata of a media content item currently presented on the client terminal, the metadata comprises at least one media content characteristic of the media content; and selecting a group of the plurality of interactive applications which are tagged as suitable for media content having the at least one media content characteristic by using the metadata; and presenting members of the group on a display of the client terminal in relation to the media content item.

Another method is taught for selecting at least one interactive application for presentation, comprising: a) identifying a plurality of interactive applications which are available for presentation on a client terminal of a user; b) automatically identifying one of a plurality of scenes of a media content item currently presented on the client terminal; c) automatically identifying at least one scene characteristic of the currently presented scene; d) selecting a group of the plurality of interactive applications which are tagged as suitable for a scene having the at least one scene characteristic; and e) presenting members of the group on a display of the client terminal in relation to the scene; and repeating the b)-e) for each one of the plurality of scenes.

Still another method is taught for selecting at least one interactive application for presentation, comprising: identifying a plurality of interactive applications which are available for presentation on a client terminal of a user; automatically identifying at least one current viewing pattern of the user; selecting a group of the plurality of interactive applications which are tagged as suitable for the at least one current viewing pattern; and presenting members of the group on a display of the client terminal.

Optionally, the at least one current viewing pattern is selected from a group consisting of: the period the user watches a media content item currently presented on the client terminal, at least one media content previously watched by the user, a frequency of recent zapping on the client terminal, a volume level at which the media content item being played on the client terminal, a display setting at which the media content item being played on the client terminal, and a current time.

According to other embodiments of the present disclosure, there is provided a method for managing a multi participant video session. The method comprises establishing a multi participant video session between a plurality of participants of a plurality of camera enabled client terminals which are connected to a network, monitoring a participation level of each one of the plurality of participants in the multi participant video session, and automatically halting the multi participant video session if respective the participation level of one of the plurality of participants is below a minimum.

Optionally, the method further comprises identifying media content currently displayed on at least one of the plurality of camera enabled client terminals and adjusting accordingly at least one of the minimum and the monitoring.

Optionally, the method further comprises identifying social connection between the plurality of participants and adjusting accordingly at least one of the minimum and the monitoring.

Optionally, the method further comprises identifying a characteristic of at least one of the plurality of participants and adjusting accordingly at least one of the minimum and the monitoring.

Optionally, the method further comprises identifying an operation action pertaining to a display of media content on at least one of the plurality of camera enabled client terminals and adjusting accordingly at least one of the minimum and the monitoring.

Optionally, the monitoring comprises capturing a plurality of image sequences each using the camera of another the camera enabled client terminal and analyzing each the plurality of image sequences to estimate a respective the participation level.

More optionally, the analyzing comprises detecting at least one of presence and absence of a face of a respective the participant in the respective image sequence, the detecting being performed according to at least one reference facial feature associated with the respective participant.

More optionally, the analyzing comprises detecting at least one of presence and absence of a face gazing at a display of a respective the camera enabled client terminal.

More optionally, the analyzing comprises detecting at least one of presence and absence of any face in the respective image sequence.

Optionally, the halting comprises terminating the multi participant video session.

Optionally, the halting comprises displaying an interactive notice which is indicative of the halting and allowing at least one of the plurality of participants to manually instruct the resuming of the multi participant video session.

Optionally, the method further comprises proceeding with the monitoring during the halting and automatically resuming the multi participant video session if respective the participation level of each one of the plurality of participants is above the minimum.

According to some embodiments of the present disclosure, there is provided a system for managing a multi participant video session. The system comprises a central unit which establishes a multi participant video session between a plurality of participants of a plurality of camera enabled client terminals which are connected to a network and a plurality of client modules each installed in another of the plurality of camera enabled client terminals and monitors a participation level one of the plurality of participants in the multi participant video session. The central unit automatically terminating the multi participant video session if it receives from one of the plurality of client modules a message which is indicative that respective the participation level of one of the plurality of participants is below a minimum.

Optionally, the plurality of camera enabled client terminals are selected from a group consisting of: Internet Protocol televisions (IPTVs), set top boxes, mobile communication devices, telephones, tablets, computers and the like.

According to some embodiments of the present disclosure, there is provided a method for establishing a multi participant video session. The method comprises receiving a request to establish a multi participant video session between a plurality of participants of a plurality of camera enabled client terminals which are connected to a network, delaying the initiation of the multi participant video session until a presence indication indicative of a presence of one of the plurality of participants in a space imaged by a respective the camera enabled client terminal is received from each one of the plurality of camera enabled client terminals, and establishing the multi participant video session between the plurality of participants via the plurality of camera enabled client terminals when the delaying is over.

Optionally, the delaying further comprises: capturing a plurality of image sequences, each using another of the plurality of camera enabled client terminals, analyzing each the image sequence to automatically detect the presence of one of the plurality of participants, and ceasing the delaying when the presence of one of each one of the plurality of participants is detected according to the analysis.

Optionally, the analyzing comprises identifying a face of a respective the participant in a respective the image sequence to detect the presence thereof a space imaged by a respective the camera enabled client terminal.

More optionally, the delaying further comprises: maintaining the delaying as long as an absence of a face of a respective the participant in identified in a respective the image sequence.

Optionally, the presence indication is generated manually by a participant selection.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DESCRIPTION OF EMBODIMENTS OF THE DISCLOSURE

Figure 1:
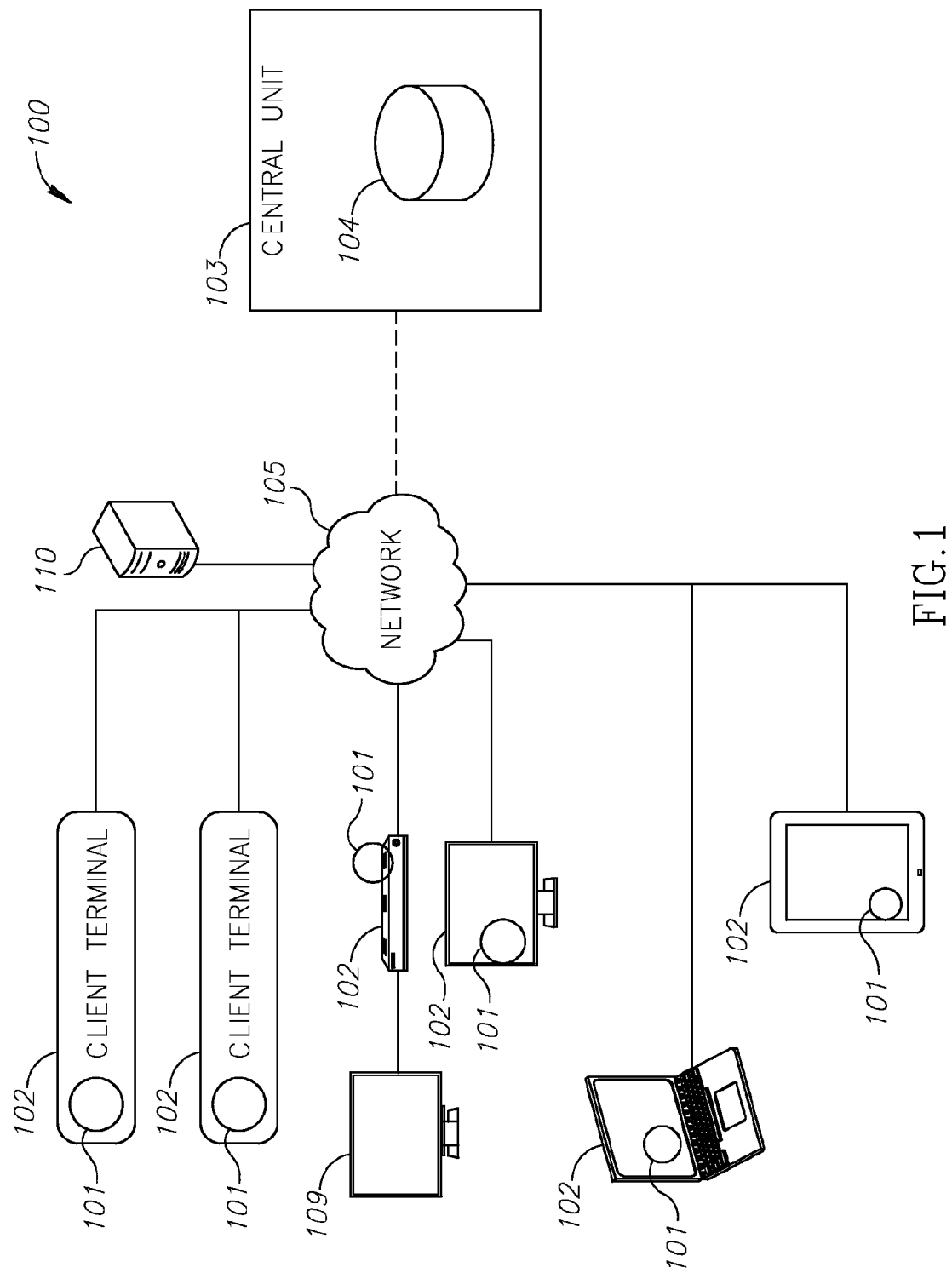
FIG. 1 is a schematic illustration of a system for creating and managing a multi participant session among viewers of common media content, and for dynamically selecting interactive applications from a plurality of interactive applications which are made available to user(s) of a client terminal, according to some embodiments of the present disclosure.

The present disclosure, in some embodiments thereof, relates to methods and systems of communication and, more particularly, but not exclusively, to a methods and systems of communication between television viewers.

According to some embodiments of the present disclosure there are provided methods and systems of creating a multi participant session among a plurality of viewers of common media content based on a multi participant session object created by one of the viewers, optionally based on a selected template. These embodiments allow a user, referred to herein as a session initiator, or a module, to select and adjust a template of a multi participant session, such as a multi participant game, a poll, and a custom made gamble. Such a user adapted multi participant session may be custom made, either manually or automatically, to a certain media content, for example to characters in a reality TV show, characteristics of a certain group of viewers, optionally socially connected, or any member thereof and/or session initiator preferences.

Optionally, the system includes a central unit which manages the multi participant sessions and a plurality of client modules which are installed in client terminals, such as set top boxes, designated devises and/or television sets, for example as described above. The central unit optionally manages a database of subscribers, optionally socially connected, and a set of templates, optionally dynamically updated by subscribers and/or system operator(s). In use, the central unit receives media content indication indicative of media content currently presented on the client terminal of the session initiator. The central unit further receives a selection indicative of a template of a multi participant session object and another selection indicative of a group from the subscribers, for example friends of the session initiator. This allows creating a multi participant session object that is adapted for the selected group according to the template and using the multi participant session object to establish a multi participant session pertaining to the media content among member(s) of the group and the session initiator.

Optionally, the template is selected by the session initiator from a dynamic set of templates. The template or the dynamic set of templates may be updated according to the session initiator, the members of the selected group, one or more characteristics of the common media content, and/or the airtime left for a broadcasted media content.

According to some embodiments of the present disclosure, a participant of a multi participant session may watch audio and/or video feeds which are captured by client terminals of other participants of the multi participant session. In such a manner, the experience of watching the common media content for one participant is enhanced by the inputs of other participants. In such embodiments, audio and/or video chats may be established among sub groups of multi participant session participants, for example as described below.

According to some embodiments of the present disclosure, promotional content is presented to participants of the multi participant session. The promotional content may be designated for a group, for example based on a combination of characteristics of a number of participants and/or includes offers for a group purchase, for example as described below.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Reference is now made to FIG. 1, which is a schematic illustration of a system for creating and managing a multi participant session among viewers of common media content, such as a broadcasted content, video on demand (VOD) content, locally stored content, recorded content, and/or a stream, according to some embodiments of the present disclosure. The media content may be a movie, a TV show, promotional content, a series, and/or the like. The viewers may be referred to herein as participants. The multi participant session may be a poll, a chat, a game, a gambling mechanism, and/or a quiz, such as a trivia quiz that is selected and/or generated according to the inputs of one of the viewers, for example the initiator of the multi participant session, as described below.

Figure 2A:
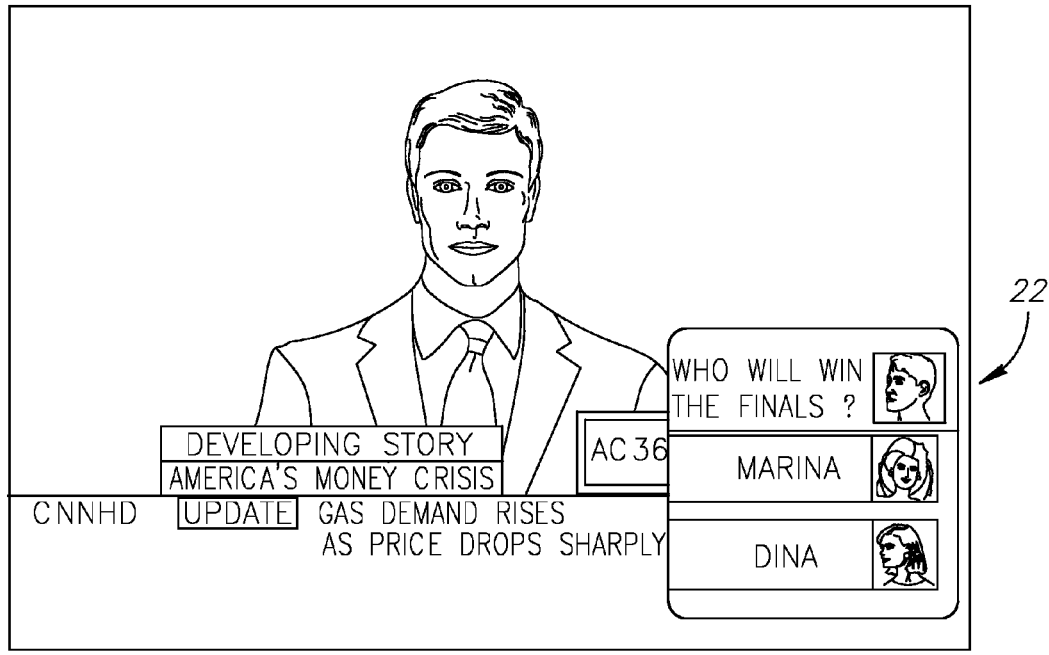
FIGS. 2A-2D are images of a broadcasted media content with different overlays of multi participant session interactive windows, according to some embodiments of the present disclosure.
Figure 2B:
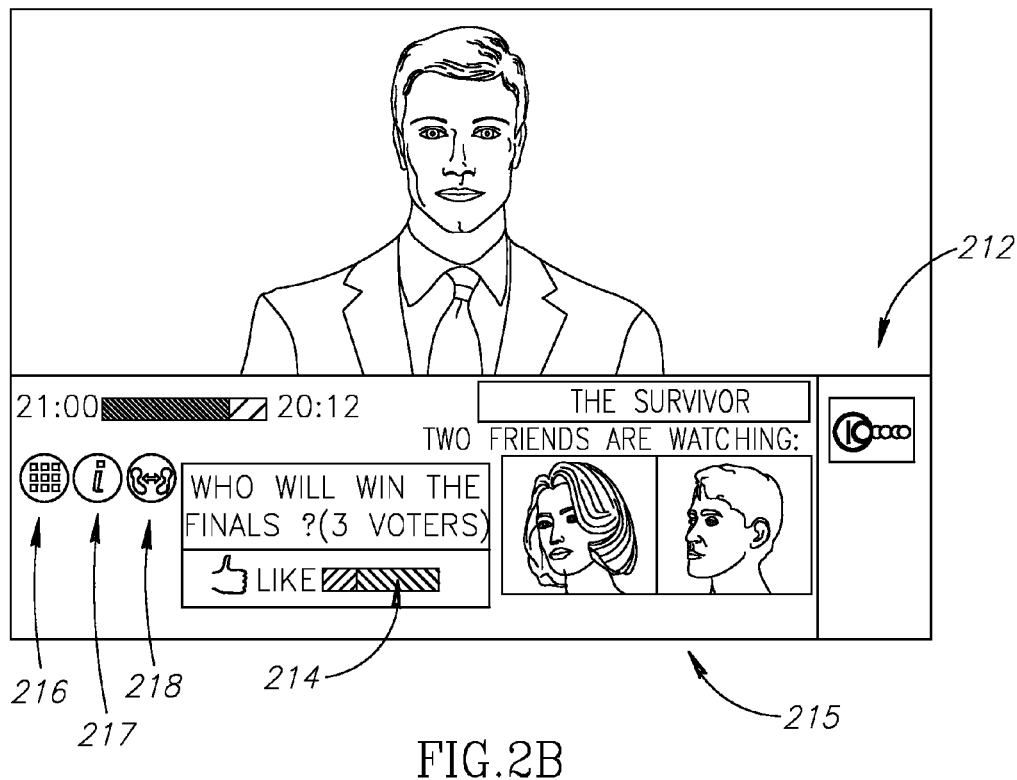

The multi participant sessions, as further described below, may be implemented using multi participant session objects managed by a central unit 103, which is optionally implemented on one or more web servers. Each multi participant session object may include instructions for generating an interactive user interface that is presented on the display of a plurality of client terminals and receives inputs from the users thereof, for example as described below. The interactive user interfaces are optionally overlays, each with dynamic graphical user interface (GUI), which are presented on top of media content that is broadcasted over the internet and/or a communication network such as a cable network and/or satellite services, provided as VOD content or a stream over the internet and/or a communication network such as a cable network and/or satellite services and/or locally recorded at one or more client terminals. For example, the multi participant session object may allow generating a plurality of interactive window displays which are presented on the screens of the client terminals 102. For example, FIGS. 2A and 2B are exemplary overlays 222, 212 which are displayed over broadcasted media content. In FIG. 2A the overlay is of an interactive window that presents options to the subscriber that participates in a multi participant session of a poll type and in FIG. 2B the overlay depicts an outcome of such a poll 214, an indication of which subscriber currently watches the media content 215, and a set if buttons for facilitating calling a subscriber 216, receiving information about the system 217 and/or to initiate a new multi participant session 218.

According to some embodiments of the present disclosure, an interactive window display may be forwarded by the client terminal 102 to a screen of a remote controlling device, such as a designated remote control device and/or a cellular phone, such as a Smartphone that functions as a cellular device, for example using a designated installed app. In such an embodiment, the interactive window display may be displayed only on the remote controlling device and/or both on the remote controlling device and on the screen of the client terminal 103. Optionally, while some interactive window displays are played on the screen of the remote control, for example audio and/or video chats, others are displayed on the screen which is connected to the client terminal and/or of the client terminal, for example the current outcome of a poll and/or video feeds of watching subscribers, for example as described below.

In an exemplary case, the remote controlling device communicates with a client terminal 102, such as a set top box, over Wi-Fi or other proprietary connection. The client terminal 102 is connected to and controls a TV set. The remote controlling device is connected to the central unit 103 through the client terminal 102.

The client terminal 102 controls a flow of content received from the central unit 103 and from other sources, such as IPTV, terrestrial broadcasts, satellite/cable broadcast and the like. The client terminal 103 may route certain content to the remote controlling device and other to the TV set. For example, content that is tagged as social is routed directly to the client terminal 102. Notification may be routed to remote controlling device directly without popping out on the screen and interfering with the media content that is being watched.

Optionally, when a number of subscribers (viewers) watch the same media content on the same TV set and logged to the system, each viewer is presented with respective interactive windows so that they can participate in different multi participant sessions simultaneously, each using her remote controlling device. In such an embodiment, the remote controlling device of a user A may be used to communicate with the remote controlling device of user B through one or more client terminals in real time interactive manner.

Optionally, the system 100 includes a plurality of client modules 101 which are installed in a plurality of client terminals 102. The client module 101 may be implemented as a software component executed by the hosting client terminal 102, for example an application from an app store, an add-on, and/or a standalone application and/or a hardware component that is installed in the hosting client terminal 102, for example an integrated circuit (IC). The client terminal 102 may be a set-top-box (STB), which is connected to a screen, such as a television (TV) 109, an Internet Protocol television (IPTV), also known as a smart TV and/or Connected TV, and/or a computing unit, such as a laptop, a desktop, a Smartphone, a cellular device, a tablet and/or any other device that can be used for providing internet TV service. Optionally, the client module 101 may establish a communication with the central unit 103 using a proxy device, such as a cellular device that communicates with the client terminal 101 and/or the like. In such a manner, the client module 101 may forward and/or receive data to and/or from the central unit 103 even when the client terminal is not connected to the central unit 103. For example, if the client terminal 102 is a set top box which has low free bandwidth, say, a cellular connection with the central unit 103 may be established via a cellular device.

Optionally, the central unit 103 is connected to each one of the client terminals 102 via a network 105, such as the Internet and/or an Ethernet and/or WLAN. In such an embodiment, the multi participant sessions are managed by the central unit 103. The display is optionally common in all the client terminals 102 and/or adjusted according the subscribers preferences in each client terminal and/or by the viewer which has initiated the multi participant session, for example as described below. As used herein, a subscriber is an identified viewer which is connected to the system 100, for example logged on and/or otherwise monitored.

It should be noted that though in the description of this present application the multi participant sessions may be managed and/or processed by a central unit, the management and/or the processing may be performed by one or more of the client modules 101. For example, a multi participant session may be managed by the client module 101 which has been used to initiate it. In such embodiments, the communication between different client modules 101 is performed over peer to peer connections and/or schemes.

Optionally, the central unit 103 includes and/or is connected to a database 104 that allows storing and updating information pertaining to the multi participant sessions, for example as described below.

In use, subscribers log into the system 100 using their client terminals 102, either manually or automatically. Optionally, the central unit 103 monitors the logged subscribers to determine which one is currently available to participate in a multi participant session. Optionally, the central unit 103 manages a subscriber profile record per subscriber. The subscriber profile records are optionally stored in the database 104. The subscriber profile record may include a connected or not-connected status indicator, a unique identification (ID), preferences, one or more social network IDs, a history log indicative of the subscriber's participation in previously held multi participant sessions, a history log indicative of multi participant sessions the subscriber initiated, a history log indicative of media content the subscriber may have watched and/or the like.

Figure 2C:
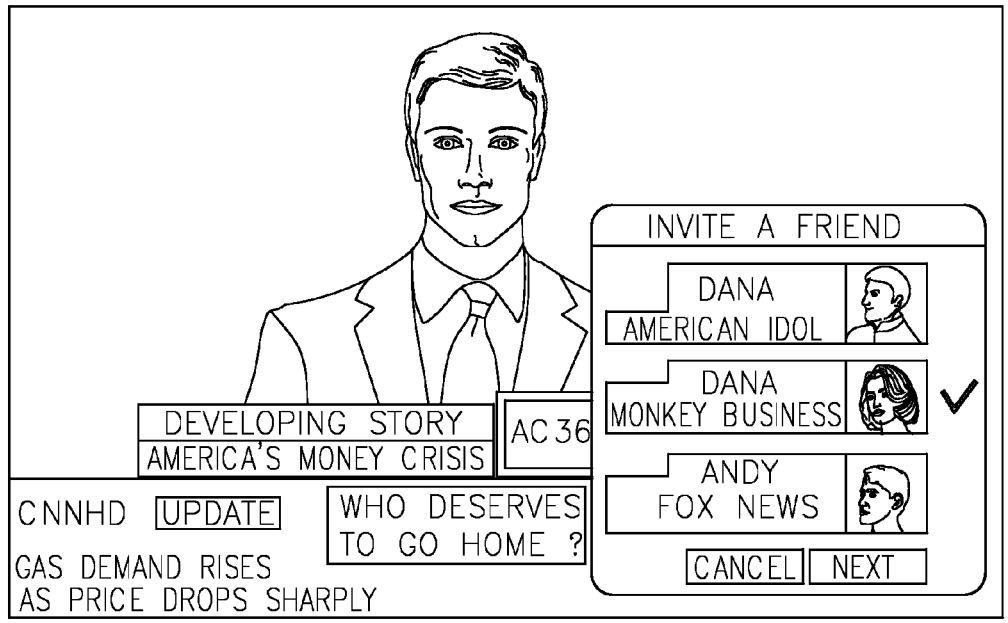

Optionally, the client modules 101 monitor the media content that is watched by the subscribers and forward the data to the central unit 103. For example, the content indications are provided via a push mechanism, such as cloud to device message (C2DM), by a pull mechanism wherein the central unit 103 polls information pertaining to the currently presented media content, and/or by a notification mechanism wherein the client module 101 sequentially notifies the central unit 103, for example every number of seconds and/or when the subscriber changes the presented media content. In such a manner, as further described below, a subscriber which views a certain media content may receive information about other subscribers, for example subscribers which are socially connected thereto. The information may teach which subscriber currently watches and/or have watched the certain media content. For example, FIG. 2C depicts an interactive window that presents information about which media content is watched by friends and optionally their availability to participate in a multi participant session. This interactive window optionally allows the subscriber to select friends for a multi participant session. Optionally, each client module 101 communicates with the central unit 103 to forward information about the media content respective subscriber currently watches and to receive and display similar information about other subscribers. Optionally, the central unit 103 is connected to a social network server. In such an embodiment, the system 100 may automatically update a status of the subscriber with an indication of the media content she is currently watches, for example "I am currently watch Dexter" a profile image of the subscriber with an icon of the media content she is currently watches, for example adds a visual tag of a show to the profile image, and/or issues a twit with the media content he is currently watches, for example "I am currently watching Dexter". In another example, the central unit 103 is connected to the cellular service provider of the subscriber, providing it with an indication about the media content that is currently watched by the subscriber. This allows the service provider to update accordingly the waiting tone of the subscriber and/or any other dynamic content cellular service.

Additionally or alternately, per subscriber, social connections are extracted from a social network that is managed by the system 100 and/or third party social networks, such as Facebook™, Twitter™, Myspace™, and/or the like. Optionally, a social graph which may define the social connections among the subscribers is stored and managed in the database 104, for example linked to the aforementioned subscriber profile records. In such a manner, each client module 101 may present to a subscriber which one of her friends is currently logged onto the system 100, and optionally which media content they watch on their client terminals 102. For example, the profile pictures of socially connected subscribers which are logged into the system 100 are presented on the display of the client terminal 102 of the certain user, each optionally together with an icon indicative of watched media content. This icon may be extracted from a visual electronic program guide (EPG) or fetched by the client 102 from the central unit 103.

Optionally, a number of subscribers may be logged as viewers that share a single client terminal 102, for example watch a movie and/or a television show together while being at the same room. In such an embodiment, as further described below, a GUI, such as an interactive window, of multi participant session object that is presented thereto may be adjusted according to a combined profile that is based on characteristics of all the viewers.

Optionally, a central unit 103 synchronizes the commonly watched media content at all participants of a multi participant session. For example, the media content may be synchronized by distributing a reference, such as an image for matching, a timeframe from a certain identifiable tag, and/or the like. In such a manner, a broadcast of certain media content may be synchronized with a respective VOD file and/or a recorded copy thereof. The synchronizing may be performed by the client modules 101, optionally automatically and/or upon request from the respective participant.

Figure 3:
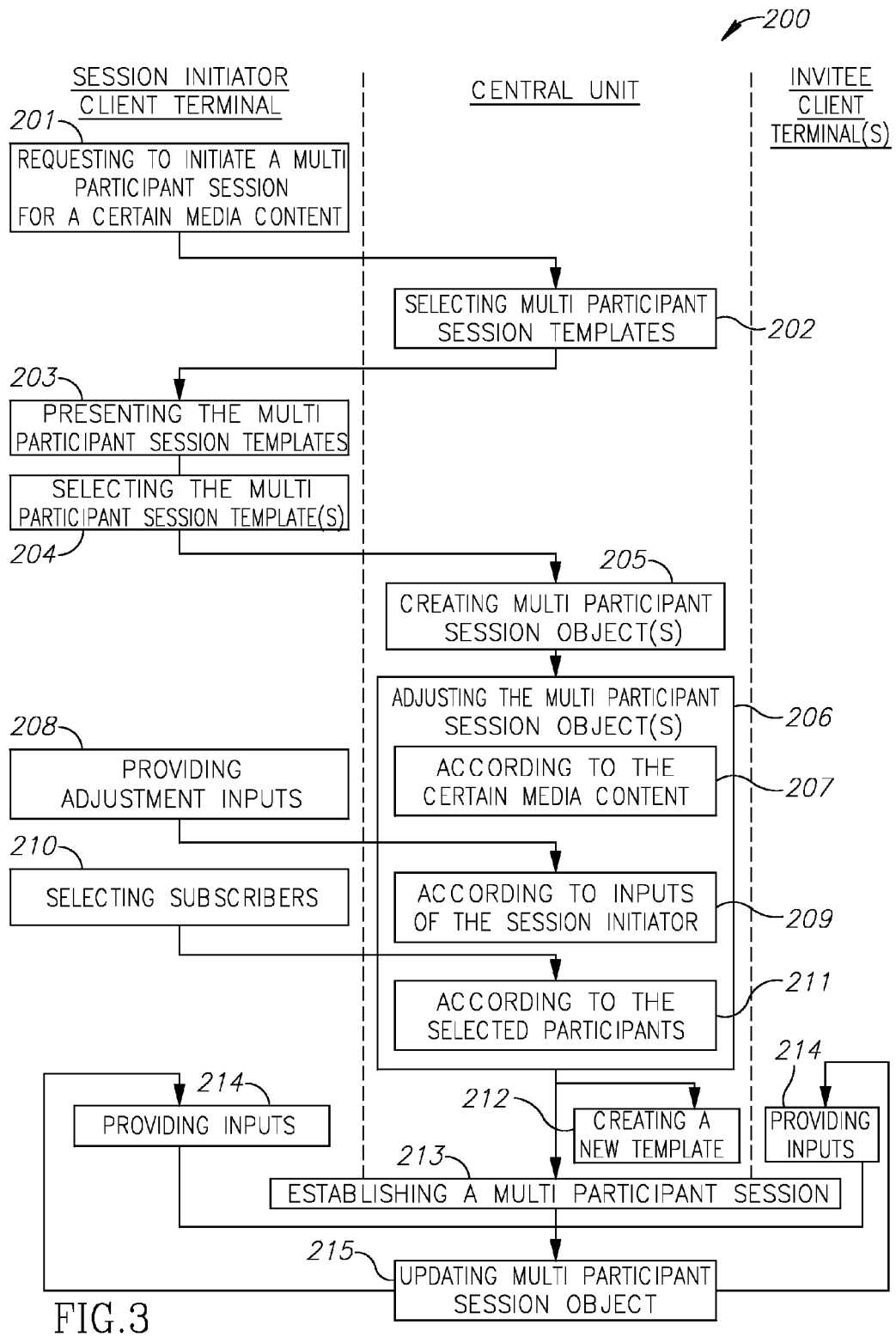
FIG. 3 is a flowchart of a method of creating a multi participant session among a plurality of viewers that watch common media content, according to some embodiments of the present disclosure.

Reference is also made to FIG. 3, which is a flowchart of a method 200 of creating a multi participant session among a plurality of viewers that watch common media content, according to some embodiments of the present disclosure. First, as shown at 201, a request to initiate a multi participant session for certain media content is sent from one of the client terminals 102 to the central unit 103. For example, a respective initiation comment is received from a subscriber, which may be referred to herein as a session initiator, on a GUI that is displayed on the screen of one of the client terminals 102, such as an interactive window display. Optionally, the request is forwarded from the client terminal 101 to the central unit 103.

Then, as shown at 202, templates of different multi participant session types are selected and presented to the session initiator. Optionally, as shown in FIG. 3, the plurality of templates are selected by the central unit 103 and forwarded to the session initiator. The templates are optionally presented in a GUI that is displayed on the screen of the client terminal 102.

Optionally, the templates are selected from a template dataset, which may be hosted by the database 104. For example, the templates are selected according to one or more of the following:

1. The identity and/or the number of the session initiator(s) which are identified as viewers on the client terminal from which the request is received.

2. The identity of one or more friends of the session initiator(s), which are currently logged to the system 100 and available for participating in a multi participant session.

3. The number of session initiator(s) which are identified as viewers.

4. The genre of the media content that is currently watched, for example whether it is a movie, a contest, a sport game, a TV series, a reality show and/or the like and/or Drama, Action, Horror, and/or the like.

5. The type of the media content that is currently watched by the session initiator(s). For example, the type of the media content may be broadcasted content, VOD content, and/or local storage content.

6. The airtime left for the media content.

As described above, a multi participant session may be of various multi participant session types, for example a poll, a chat with one or more subscribers, a game, such as a board game and/or a role-play game, a gambling mechanism, a riddle and/or a quiz, such as a trivia quiz. Each template may be adapted to a certain multi participant session type.

Figure 2D:
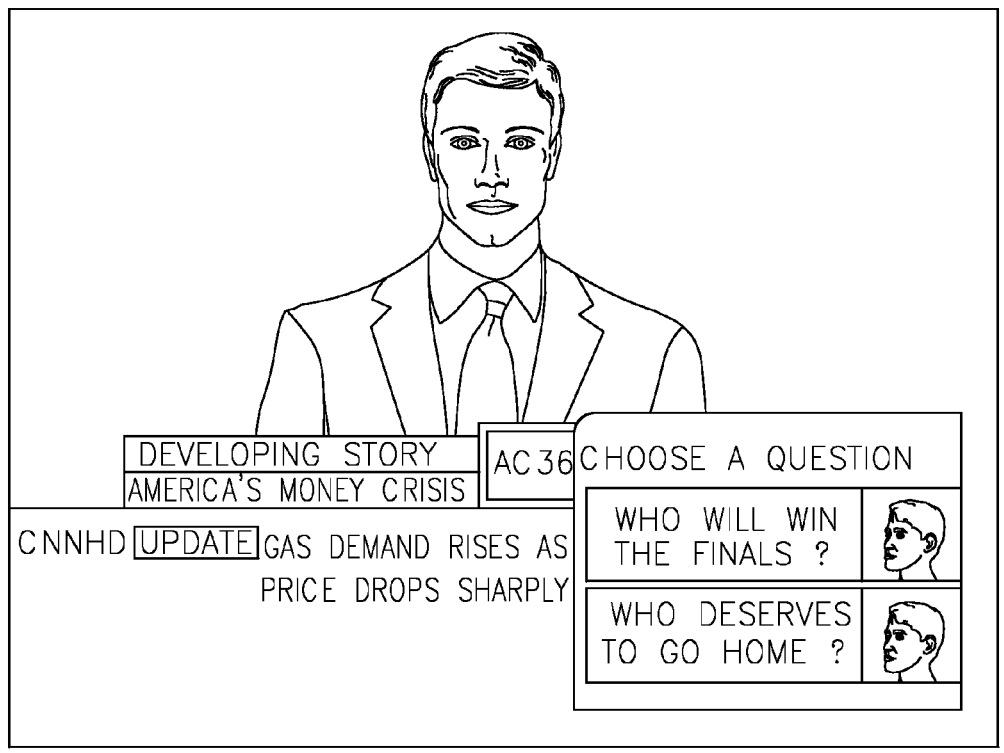

Optionally, the templates are adapted according to one or more characteristics of the media content that is commonly watched by the participants. For example, a base quiz template may be adjusted automatically to fit a certain genre (i.e. open questions in a documentary and closed question in a reality show) and/or to the airtime left for the media content (i.e. less questions if the airtime of the media content is about to end soon). For example, as shown at FIG. 2D, the template is implemented as an interactive window that allows the subscriber to select one or more questions for her multi participant session, for example for a poll. The subscriber is presented with a number of predefined questions, for example previously uploaded by one of the subscribers and/or by the operator. Optionally, templates are created by the operator of the system 100, for example for promotional uses and/or to fit contemporary trends. For example, before or during the finals of a reality show, a template that includes a poll pertaining to the finalists is added by the operator. Optionally, templates are created automatically by the system 100, for example according to a textual analysis of electronic program guides (EPGs), and/or the like. For example, when the last episode of a reality show is detected according to textual analysis of an EPG, a template that includes a quiz with questions from previously created multi participant session objects is automatically generated. In another example, the templates are created automatically according to a textual analysis of a media content webpage, such as a show website and/or a respective Facebook™ page.

Now, as shown at 204, the session initiator selects a template to create a multi participant session object, as shown at 205.

Optionally, as shown at 206, the multi participant session object is adjusted. Optionally, as shown at 207, the multi participant session object is a content aware object that is adjusted according to the media content which is currently watched and/or selected by the session initiator and/or currently watched by subscribers which are socially connected thereto, for example friends and/or followed peers in a social network, such as Facebook™, Twitter™ or the like. Optionally, as shown at 205, the multi participant session object is adjusted according to media content from several channels. For example, a multi participant session object with a gambling mechanism may be updated according to data from a number of different channels that broadcast a number of sport games held simultaneously.

Additionally or alternately, as shown at 208 and 209, the multi participant session object is adjusted according to the inputs of the session initiator. For example, if the template is a template of a quiz, the multi participant session object may be adjusted by one or more questions and optionally potential answers which are selected and/or provided by the session initiator. In another example, if the multi participant session object is based on a template of a poll, the session initiator may select and/or provide one or more questions and candidates. In another example, if the multi participant session object is based on a template of a Sport gamble (i.e. football, basketball, and/or soccer), the user (or the system 100, as described above) may create a social gamble on "who will win?" and/or "what will be the score?" and optionally define few options for the session initiator to select from. Then, a user can send it to invitees, for example some of his friends, with a time limit to vote. After the invitees have voted, an interactive window displays, during the game, which participant has most chances to win the bet and at the end of the game which participant won, and optionally with statistic that combines previous outcomes. In another example, the multi participant session object is based on a template of a reality show. The user may add an option that allows participants of a certain multi participant session to place bets on who will win a certain mission, such as an immunity mission in The Survivor™ style show, who will be dismissed from the reality show, who will get most of the votes (i.e. the public's favorite in American idol) and/or who will win the title in a beauty contest. Optionally, the session initiator selects avatars and/or nicknames for the invitees. Optionally, each invitee may adjust the avatar and/or the nickname thereof.

As shown at 210, the session initiator selects a group from the subscribers of the system 100, for instance from the subscriber profile records in the database 104, for participation in the multi participant session. In such an embodiment, as shown at 211, the multi participant session object may be according to the subscribers which are selected by the session initiator. Optionally, in use, as described above, the client module 101 generates a display which indicates to the session initiator which of her friends is currently logged into the system 100 and allows her to add any of these subscribers to the selected group. The central unit 204 receives one or more indicators pertaining to the subscribers of the selected group and sends each member of the group an invitation to watch the media content that is currently watched by the user (i.e. if he does not already watches it) and an invitation to participate in the personalized interactive session.

Optionally, the multi participant session object is adjusted according to the selected subscribers. For example, the multi participant session object is adjusted to fit the number of selected subscribers. In another example, if the template is a template of a quiz, questions are selected according to the multi participant session history or preferences of each subscriber, for example from his subscriber profile record (i.e. questions which previously presented thereto).

Optionally, the multi participant session object is adjusted according to selections of the selected subscribers and/or information pertaining thereto. In such an embodiment, teams may be built up according to subscribers' preferences and/or selections. These teams can be managed by the multi participant session object, for example for determining a winning team in a quiz according to answers of its participants and/or the like.

Optionally, as shown at 212, the created multi participant session objects may be converted to new templates and stored in the database 104. In such a manner, a session initiator may use multi participant sessions objects which were previously created by other session initiators. This addition may be performed in real time, allowing subscriber to share, with his friends, multi participant session objects which were recently created for a certain broadcast she currently watches, such as a live broadcast.

Now, as shown at 213, a multi participant session is established among the session initiator and a plurality of invited subscribers who accepted the invitations, which may be referred to herein as invitees. The multi participant session is optionally established when interactive windows which display common content are generated, according to the multi participant session object, on the displays of client terminals of the invited subscribers. The interactive windows are optionally displayed as overlays on the display of the common media content.

As shown at 214, during the multi participant session, a plurality of inputs from the session initiator and the plurality of invited subscribers are received. These inputs are used to update the interactive multi participant session object, as shown at 214. For example, answers to a poll or a quiz are updated. In such embodiments, the subscriber may type a textual message and/or make a selection on his client terminal, for example by using an interactive window that is presented thereto. The textual message and/or selection is forwarded to the central unit 103 which updates, accordingly, the respective interactive multi participant session object and the interactive windows which are presented to other participants. The inputs may be votes, for example like/dislike indication pertaining to a show, a character, a team, a participant, and/or the like.

Optionally, data from other multi participant session objects which are related to the watched content may be combined into the multi participant session object. For example, the overall rating of a certain figure of a show may be calculated and presented. Statistics such as how many of friends and/or subscribers voted and/or who voted may also be presented on the interactive windows.

According to some embodiments of the present disclosure, a sequence of images of each one of the participants of the multi participant session, for example a live video feed, is captured and presented to all other participants. In such an embodiment, some or all of the client terminals 101 comprise an imaging device, such as a camera or an image sensor. Optionally, the video feeds are processed as part of the multi participant session. For example, winning or losing image processing effects may be added to video feeds of winning and/or losing participants and/or according to a combination of the participants' preferences and a progress in media content that is displayed to all participants. The progress in the media content is optionally identified by analyzing a textual content of a website that publishes information pertaining to the media content, for example a sport website that publishes scores in real time. In another example, each participant is instructed to perform a certain gesture, such as a wave gesture, and video feed is processed to identify the certain gesture. This allows creating a mixture that presents some or all of the participants creating a "crowd wave" together.

According to some embodiments of the present disclosure, promotional content, which is adapted to a group of participants of a multi participant session, is presented during the multi participant session. As described above, a multi participant session object may allow a group of subscribers to interact while watching common media content, for example a chat multi participant session and/or the like. This interaction is optionally performed using interactive windows which are presented to participants. Optionally, promotional content that is adapted to the participants is presented in some or all of the interactive windows and/or respective client terminals. For example, the promotional content may be selected according characteristics of the group, for example an average age, gender, a geographic location and/or an analysis of any other characteristic thereof, for example based on information that is extracted from their social network profiles. Optionally, the promotional content includes group shopping coupon(s) and/or offer(s). For example, an offer to purchase a plurality of gym subscriptions in a discounted rate, such as a gym subscription per participant, is offered to the participants. Optionally, the promotional content is selected according to the commonly watched content. For example, basketball games subscription may be suggested in a discounted rate for all members in the group and/or a number of proximate sits for a sport game and/or a theater movie is suggested to the participants. In another example, a table in a restaurant may be offered to the group, for example for celebrating an outcome of a commonly watched game and/or a social event, such as a birthday of one of the participants. Optionally, the promotional content is arrived from an external advertisement (ad) server, such as 110 in FIG. 1.

According to some embodiments of the present disclosure, the system 100, or a similar service, allows a subscriber, such as the session initiator, to fund the right to watch media content together with for one or more remotely located subscribers, for example to purchase or subsidize, optionally tentatively the right to access and use, for example play, media content. This allows the subscriber to invite his friends to watch media content she paid or partly paid for, without any debit or with a reduced debit. In these embodiments VOD objects may actually be used as push objects which are sent to a subscriber and not a pull object that the access thereto is initiated by the subscriber. In use, the subscriber selects media content and uses the client module 102 to send invitation(s) to one or more subscribers. The invitations are optionally sent via the central unit 103, which instructs a respective billing mechanism, such as a billing server, to bill the subscriber when the invitees accept the invitations and/or access the media content. In such embodiments, the VOD service provider and/or the system 100 may offer subscribers with a special price for group watching. For example, a right to watch certain media content on a plurality of client terminals, optionally simultaneously, or substantially simultaneously, may be offered in a discounted rate in relation to the purchase of a plurality of separate and independent rights to watch the certain media content. Optionally, invitations to certain media content are sent with invitations to participate in a multi participant session that is related to the certain media content. As described above, a multi participant session object may define a gamble or a contest among participants. Optionally, the losing contestant(s) of the defined gamble or contest receive the automatically debited for the right for watching media content together with for one or more remotely located subscribers.

According to some embodiments of the present disclosure, a participant of a multi participant session, such as a chat, for example audio and/or video chat, may initiate a sub multi participant session, for example another audio and/or video chat, with a selected sub group of one or more participants from the multi participant session. In such a manner, communication between sub groups may be held among a certain sub group of participants without members of another sub group of the multi participant session, for example a complementary sub group. Optionally, such a sub multi participant session may be initiated using the GUI of the client module 102, for example using the interactive window of the multi participant session object. In such an embodiment, a participant of a multi participant session that is related to a football match between team A and team B may establish a sub multi participant session wherein he can discuss with participants which cheer team A without letting participants which cheer team B to participate. The sub multi participant sessions are optionally held on separate media channels which are simultaneously managed by a proxy, for example the central unit 103. Additionally or alternatively, sub multi participant sessions are simultaneously established over P2P connections.

Optionally, a decoy video is displayed for participants of the multi participant session which are not participants of the sub multi participant session. The decoy video may be recorded and replayed as long as the sub multi participant session is taking place. In such a manner, participants may communicate in a manner that does not allow other participants to notice.

Other aspects of the present disclosure, in some embodiments thereof, relate to interactive content and, more particularly, but not exclusively, to methods and systems of enriching interactive content presentation.

According to an aspect of some embodiments of the present disclosure there are provided methods and systems of dynamically selecting interactive applications from a repository of interactive applications which are available to a user, for example stored on a client terminal, based on the media content item that is currently watched by the user.

For example, one of the methods is implemented by automatically identifying a media content item that is currently presented on a client terminal, for example according to an EPG and/or information from the media content source and automatically identifying one or more media content characteristics of this media content, for example requesting the information from a central unit that accesses a database of media content records. This allows selecting a group of available interactive applications which are tagged as suitable for media content items that have such media content characteristics and presenting the members of the group on a display in relation to the media content item.

According to an aspect of some embodiments of the present disclosure there are provided methods and systems of dynamically selecting interactive applications which are suitable to a scene of a media content that is presented to the user. In such an embodiment, records that document scene characteristics may be used to match a group of interactive applications from a repository of interactive applications which are available to a user, for example stored on a client terminal.

According to an aspect of some embodiments of the present disclosure there are provided methods and systems of dynamically selecting interactive applications from a repository of interactive applications which are available to a user, for example stored on a client terminal, based on current viewing pattern of a user.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Referring back now to FIG. 1, the system 100 may be used for dynamically selecting a group of interactive applications from a plurality of interactive applications which are made available to one or more user(s) of a client terminal, such as a customer premises equipment (CPE), for example a set-top-box or an internet protocol television (IPTV), based one or more characteristics of media content which currently presented and/or selected to be presented to the user(s), according to some embodiments of the present disclosure. Such a system allows presenting user(s) of a client terminal 102 with interactive applications which are relevant to currently presented and/or selected media content and avoiding overwhelming these users with redundant interactive applications which are not suitable for the content media item.

The media content may be a broadcasted content, a video on demand (VOD) content, a locally stored content, a recorded content, and/or a stream, for example a movie, a TV show, promotional content, a series, and/or the like. An interactive application may be any application designed to by presented before, after and/or in parallel to a media content item, including, but not limited to an internet app, a poll, a chat, a game, a gambling mechanism, a data overlay that is adapted to the media content item, a data overlay that is adapted to another media content item and/or a quiz. The interactive applications may be locally installed on the client terminals and/or remotely installed on a network node, such as a server and accessed via the network 105. An interactive application may be implemented by an object, for example an app, which is downloaded to the hosting client terminal 102. This object may include instructions for generating an interactive user interface that is presented on the display of the client terminal and receives inputs from the user(s) thereof. The interactive user interface is optionally an overlay with a dynamic graphical user interface (GUI) that is presented in conjunction with of media content that is broadcasted over the internet and/or a communication network such as a cable network and/or satellite services, provided as VOD content or a stream over the internet and/or a communication network such as a cable network and/or satellite services and/or locally recorded at one or more client terminals.

Optionally, the system 100 includes a plurality of client modules 101 which are installed in the client terminals 102. The client module 101 may be implemented as a software component executed by the hosting client terminal 102, for example an application from an app store, an add-on, and/or a standalone application and/or a hardware component that is installed in the hosting client terminal 102, for example an integrated circuit (IC). The client terminal 102 may be a set-top-box (STB), which is connected to a screen, such as a television (TV) 109, an IPTV, also known as a smart TV and/or a connected TV, and/or a computing unit, such as a laptop, a desktop, a Smartphone, a cellular device, a tablet and/or any other device that can be used for providing internet TV service. Optionally, the client module 101 may establish a communication with the central unit 103 using a proxy device, such as a cellular device that communicates with the client terminal 102 and/or the like. In such a manner, the client module 101 may forward to and/or receive data from the central unit 103 even when the client terminal is not connected to the central unit 103. For example, if the client terminal 102 is a set top box which has low free bandwidth, a cellular connection with the central unit 103 may be established via a cellular device. Optionally, the central unit 103 is connected to each one of the client terminals 102 via a network 105, such as the Internet and/or an Ethernet and/or WLAN.

Optionally, the central unit 103 includes and/or connected to a database 104 that allows storing a plurality of media content records, each having a media content identification (ID) and a plurality of media content characteristics which are indicative of a genre, a length, a rating, an age rating, a language, an origin country, a production source, a production date, indirect advertising content and/or the like.

As further described below, the media content records allow the central unit 103, for example a matching module, to reply to requests for media content characteristics where each request is indicative of a certain media content with plurality of media content characteristics, for example as described below.

Optionally, each client module 101 is set to monitor the media content that is watched by a user in run time and forwards a request for media content characteristics with the ID of the currently watched media content item and/or the selected media content item to the central unit. For example, the characteristics request is sent via a push mechanism, such as cloud to device message (C2DM), by a pull mechanism wherein the central unit 103 polls information pertaining to the currently presented and/or selected media content, and/or by a notification mechanism wherein the client module 101 sequentially notifies the central unit 103, for example every number of seconds and/or when the subscriber changes the presented media content. In such a manner, as further described below, a client terminal of a user which views certain media content may receive a response indicative of media content characteristics of the certain media content.

Optionally, the central unit 103 includes an updating module which manages one or more web crawlers for updating existing plurality of media content records and/or adding new plurality of media content records, for example based on an analysis of electronic program guides (EPGs). In such an embodiment, the system 100 may automatically record the date each media content record was last updated. Optionally, the central unit 103 allows user to update and/or add media content records, for example using a user interface that is presented thereto, for example via a interactive application that is hosted by the client terminal and/or accessed thereto.

Figure 4:
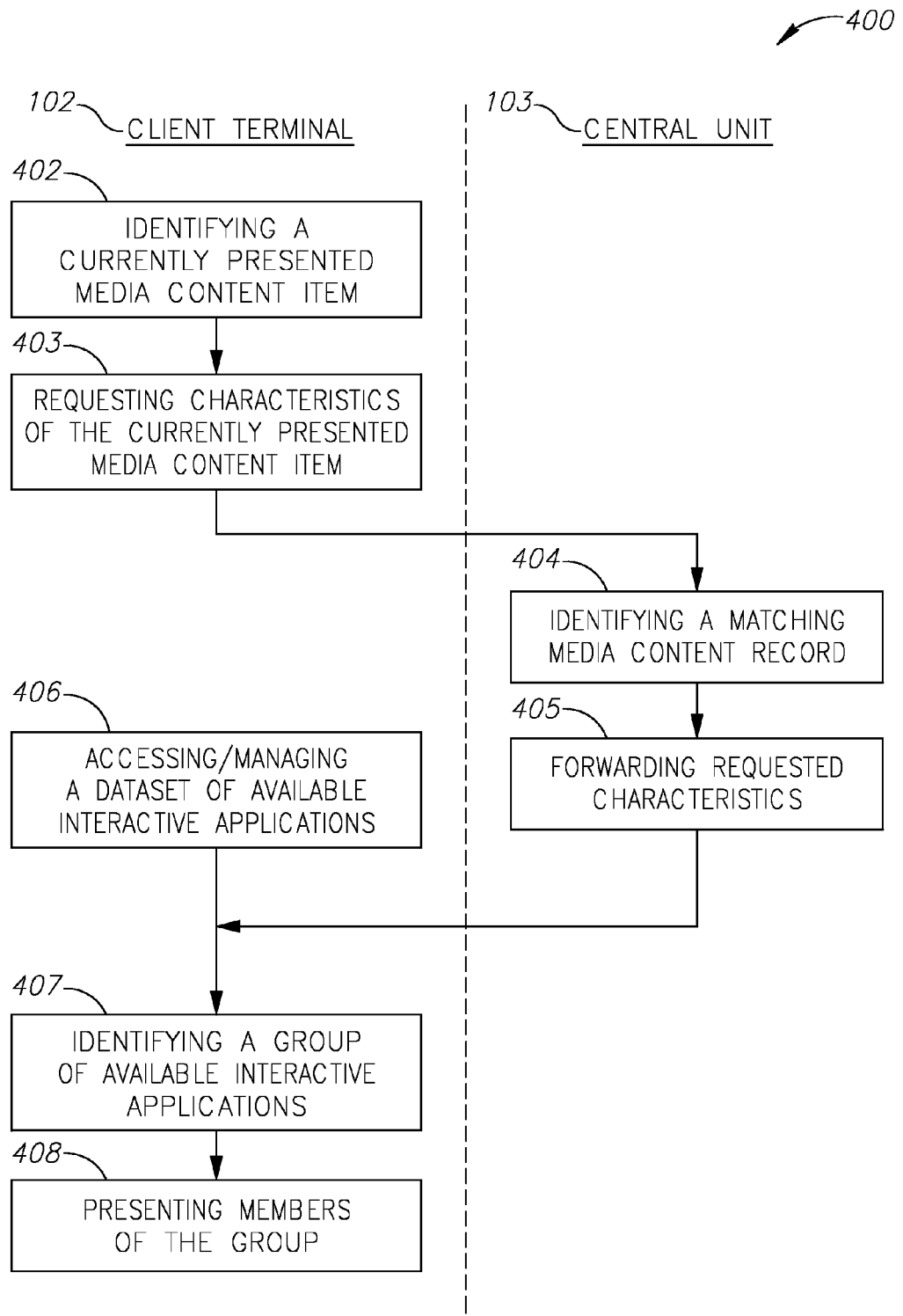
FIG. 4 is a flowchart of a method of selecting and/or filtering interactive applications, according to some embodiments of the present disclosure.

Reference is also made to FIG. 4, which is a flowchart of a method 400 of selecting and/or filtering interactive applications from a plurality of interactive applications which are available to a user and/or a client terminal, according to some embodiments of the present disclosure.

As shown at 402, the client module 101 identifies, optionally automatically, a media content item that is currently presented and/or selected to be presented on the hosting client terminal 102. As used herein, a selected to be presented media content item may be an ordered media content item, a recorded media content item, and/or the like. The media content item is optionally received from a signal source such as an Ethernet cable, a satellite dish, a coaxial cable (see cable television), a telephone line including digital subscriber line (DSL) connections, broadband over power line, or even an ordinary very high frequency (VHF) or ultrahigh frequency (UHF) antenna. The media content item may be a video on demand item that is played on the client terminal, a file played from a memory and/or a stream received from a portal. Content, in this context, could mean any or all of video, audio, Internet webpages, interactive games, or other possibilities. The identification may be performed by analyzing the stream, the file, and/or the broadcast that includes the media content item, for instance by decoding a data channel and/or the like. Optionally, identification may be performed by detecting the broadcast source of the media content, for example the identification of the broadcasted channel, and identifying the media content that is currently broadcasted by analyzing one or more electronic program guides (EPG) in light of the current time. Optionally, identification may be performed by acquiring a real time data from a server in a cloud pertaining to media content, such as broadcasted content, IPTV, local files, VOD files, and/or the like. The cloud server optionally notifies that the client terminal which application(s) to choose and present. The client module 101 optionally allows one or more available applications to receive push notifications which are distributed with certain media content or media content type and to be launched when the system recognizes that such media content is currently been broadcasted.

As further described below, the decision of which applications to launch, show, and/or expose is not only based on the content but also based on the characteristics of the user who is currently watching the media content and/or friends which are currently watching the same media content. For example, if the subscriber watches a football match alone, she can get one type of applications and if the subscriber watches it with my friends a different set of applications is received.

This allows identifying one or more media content characteristics of the selected and/or currently played media content item. Optionally, as shown at 403, the client module 101 sends an identifier of the media content item as a request and/or a query to receive from the central unit 103 the content media content characteristics thereof. Additionally or alternatively, the client module 101 sends a general request for the content media content characteristics of the selected and/or currently played media content item, without having information about the selected and/or currently played media content item. In such an embodiment, the information may be gathered from a third party, for example, a content provider, such as a VOD server, based on the identity of the client terminal 102, for example its internet protocol (IP) address.

The central unit 103, optionally as shown at 404, reviews the database 104 to identify a media content record of the selected and/or currently watched media content based on the identifier. As shown at 405, at least the media content characteristics from the media content record are now forwarded to the client module 101 as a response to the request.

As shown at 406, the client module 101 manages and/or accesses a dataset which includes entries and/or records indicative of a plurality of interactive applications available for presentation on a respective hosting client terminal 102. An available interactive application is optionally an application available for use by user(s) of the client terminal 102 without a registration process and/or an installation process. For instance, the interactive applications dataset lists the interactive applications which have been purchased, downloaded, and/or selected by the user and/or have been licensed to the user. Additionally or alternatively, the interactive applications dataset lists the interactive applications which are available for purchase by the user(s) of the client terminal 102. Additionally or alternatively, the interactive applications dataset lists the interactive applications which have been downloaded to, installed on and/or otherwise associated with the client terminal 102. The records and/or entries of the interactive applications dataset may be provided to the client module 101 upon demand and/or accessed by a pull request. Additionally or alternatively, the interactive applications dataset lists the interactive applications which are selected to the user(s) of the client terminal 102 based on one or more characteristics thereof, for example demographic data, user identifier, usage history and statistical analysis.

Optionally, each record and/or entry, for brevity referred to herein as an interactive application record, documents one or more suitable media content characteristics of a respective interactive application. The suitable media content characteristics are indicative of properties of media content items to which the respective interactive application is suitable and/or not suitable, for example a genre, a length, a rating, an age rating, a language, an origin country, a production source, a production date, and/or the like. For example, the suitable media content characteristics of a sport gambling interactive application may be a genre=sport, a length=any, a rating=10/10, an age rating=18<, a language=English, an origin country=USA, and/or a production source=ESPN/NBC sports/FOX sports. In another example, the suitable media content characteristics of a trivia interactive application may be a genre=documentary, a length=any, an age rating=12<, and/or an origin country=any.

The suitable media content characteristics of the records in the interactive applications dataset and the media content characteristics of the selected and/or currently watched media content may be matched by the client module 101 to identify a group of interactive applications which are suitable for the selected and/or currently presented media content, as shown at 407. Each one of the suitable media content characteristics and/or the media content characteristics may be weighted. For example, the client module 101 matches between the media content characteristics from the respective media content record and the suitable media content characteristics of the interactive applications documented in the interactive application records. The group is either filtered from the interactive applications dataset and/or selected accordingly.

Optionally, the media content characteristics from the respective media content record is matched with the suitable media content characteristics of interactive applications from an app store 110. This allows presenting to the user with interactive applications which are suitable for the media content she is currently watching.

As shown at 408, indication of the members of the group is now presented on a display of the client terminal. For example, icons of the interactive application are presented to the user. Optionally, one or more members of the groups are automatically launched to be presented with the selected and/or currently presented media content and/or added to a dynamic menu.

The process depicted in 401-408 is optionally continuously repeated whenever the user changes the media content items she watches. In such a manner, interactive applications, which are presented to the user, are dynamically adapt to the media content he consumes. For example, sport related interactive applications may be replaced with current matters interactive applications when the user switches from watching a soccer game to watching the news.

Optionally, the media content records and/or the interactive application records are updated by the operator of the system 100.

Additionally or alternatively, the media content records and/or the interactive application records are updated automatically by an updating module of the system 100. Such an updating may be performed using crawlers which crawl in interactive application data pages presented in records of EPG(s) and/or app store(s) and a semantic analysis module which analyzes the crawled content to extract media content characteristics and/or suitable media content characteristics in an automatic manner. Additionally or alternatively, the media content records and/or the interactive application records are updated by users of the system 100, for example via a graphical user interface that is available via the client terminals 102. The updating may be performed using window(s) that allow the user to input manually the media content characteristics and/or the suitable media content characteristics.

According to some embodiments of the present disclosure, media content items and/or interactive applications are tagged with one or more media content characteristics and/or suitable media content characteristics. In such an embodiment, the media content items and/or interactive applications are set with a metadata field that can be used for matching therebetween. For example, each one of the media content item files and/or interactive application modules may include a record with the respective metadata. This allows a client module to select and/or filter a group of interactive applications without using the central unit 103 and/or other network entities. Optionally, the software development kit (SDK) of the interactive applications allows developers to set suitable media content characteristics therefore.

According to some embodiments of the present disclosure, media content items are directly associated with interactive applications and/or vice versa. In such embodiments, an application developer can register her applications for a specific media content item, for example a broadcasted show, for example by specifying EPG name and/or time and/or date and the system 100. In such an embodiment, the media content record of the media content item includes identifier(s) of one or more interactive applications. This allows the client module 101 to add the respective interactive applications to the selected group when the respective media content item is presented or about to be presented on the client terminal 102. Alternatively, the interactive application records includes a media content item identifier that may be matched with the identifier of the selected and/or currently presented media content to determine whether the client module 101 has to add the respective interactive application to the selected group. In such an embodiment, interactive application which are designated for a certain show may be selected automatically when the show is aired or about to the aired.

According to some embodiments of the present disclosure, interactive applications are selected to be suggested to the user according to friends of the user which also watch the currently presented media content item and/or about to watch the currently presented media content item. For example, a chat application may be automatically launched and/or added to the interactive application suggested to the user if one or more of her friends currently watch the same content. Optionally, the interactive applications are commercial applications which contain a commercial content.

According to some embodiments of the present disclosure, interactive applications are selected to be suggested to the user according media content characteristics which are acquired from external sources, such as a clock, an EPG, a web page which includes media content items description, a media center system and/or the like.

Figure 5:
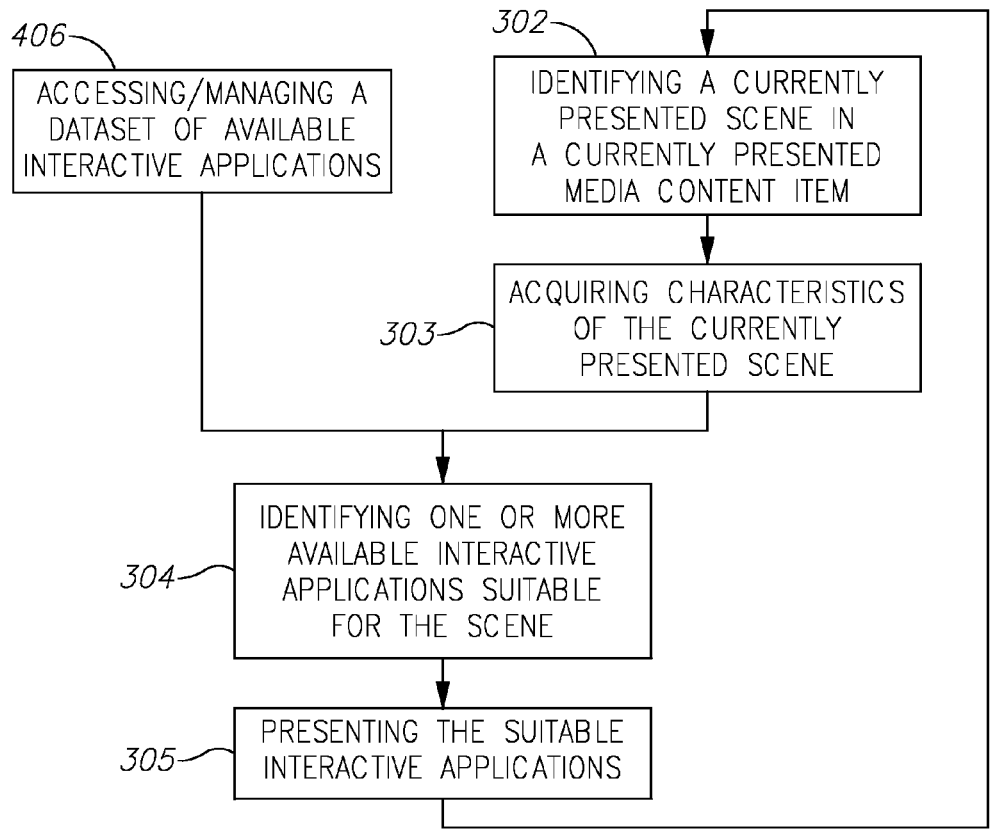
FIG. 5 is a method of dynamically selecting one or more interactive applications adapted for a media content scene which currently presented and/or selected to be presented, according to some embodiments of the present disclosure.

Reference is now also made to FIG. 5, which is a method of dynamically selecting one or more of the interactive applications which are made available to user(s) of a client terminal based one or more characteristics of a media content scene which currently and/or selected to be presented to the user(s), according to some embodiments of the present disclosure. Block 406 is optionally as described above; however, blocks 302-305 describe operations for providing a user with an experience wherein the interactive applications which are suggested thereto and/or automatically launched are dynamically changed according to characteristics of the scene that is currently presented thereto.

As shown at 302, the scene is identified. For example, the identification may be according to the time elapsed since the media content has been aired and/or played. Additionally or alternatively, the identification may be according to the tags which are added to the media content item. Now, as shown at 303, one or more scene characteristics of the identified scene are identified. A scene characteristic may be the scene timing, for example, an opening scene a closing scene and/or the like, a rating, an age rating, a language, a visual content related characteristic, for example related to objects depicted or not depicted in the scene, an audible content related characteristic, for example define whether a monolog, dialog and/or a background music are played, and/or the like. Optionally, in order to facilitate the acquiring of scene characteristics, each of the aforementioned media content records defines one or more scene characteristics per scene. This information may be acquired by a request sent to the central unit 103, for example as described above and/or according to tags which are added to the media content.

Now, as shown at 304, the scene characteristics of the currently presented scene are matched with the suitable media content characteristics of the interactive applications. Then, the one or more matched interactive applications are automatically presented to the user, for example launched and/or added to a dynamic menu as described above. Optionally, the process depicted in blocks 302-305 is repeated for all the scenes of the media content item. This allows a dynamic adaption of the interactive applications which are suggested to the user per scene.

Figure 6:
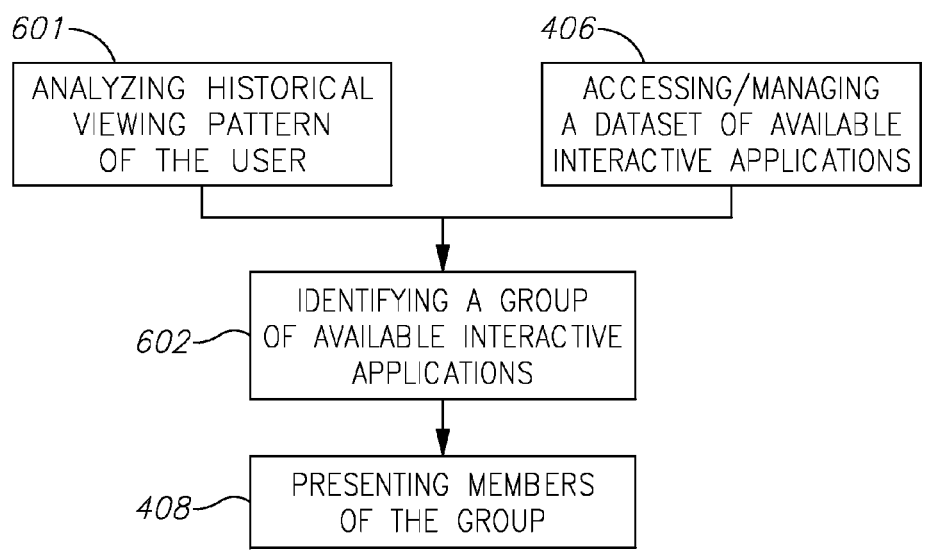
FIG. 6 is a method of dynamically selecting one or more of the interactive applications which are made available to user(s) of a client terminal based on current viewing pattern characteristics, according to some embodiments of the present disclosure.

Reference is now also made to FIG. 6, which is a method of dynamically selecting one or more of the interactive applications which are made available to user(s) of a client terminal based on current viewing pattern characteristics, according to some embodiments of the present disclosure. Blocks 406 and 408 are optionally as described above; however, new blocks 601-602 describe operations for providing a user with an experience wherein his viewing patterns effect the interactive applications which are suggested thereto and/or automatically launched to be presented thereto. In such an embodiment, the client module 101 monitors the viewing habits of the user. For example, the client module 101 identifies any of the following viewing patterns:

1. The period the user watches a media content item. This information may be gathered by monitoring the content that is displayed on or via the client terminal and/or by querying a respective display unit.
2. The media content item(s) the user watched before the currently presented media content item, for example during the last hour. This information may be gathered by monitoring the content that is displayed on or via the client terminal and/or by querying a respective display unit.
3. The frequency of recent zapping of the user, for example the zapping frequency in last minutes, for example the last 5, 10, 15, and/or 30 minutes or any intermediate length. This information may be gathered by monitoring the content that is displayed on or via the client terminal and/or by querying a respective display unit.
4. The volume level at which the media content item(s) are played. This information may be gathered by querying or monitoring a respective display unit.
5. The display setting at which the media content item(s) are played. This information may be gathered by querying or monitoring a respective display unit.
6. The time of the day and/or the year, the day in the week. This information may be acquired from an integral and/or external clock module.

In order to select interactive applications, which are adapted to the current viewing pattern of the user, each interactive application is tagged with suitable viewing pattern characteristics. These characteristics may be indicative of a suitable range of periods and/or suitable range of zapping frequencies and/or one or more suitable media content characteristics for matching with the characteristics of the media content item(s) the user watched before the currently presented media content item. This allows, as shown at 602, matching between the current viewing pattern and a group of the interactive applications. Optionally, this group of the interactive applications is added to group of interactive applications that is identified according to the media content characteristics, for example as described above. Optionally, some members of this group and the group of interactive applications which is identified according to the media content characteristics are selected according to a relative suitability which may be determined based on weights which are given to different media content and/or viewing pattern characteristics.

Still further aspects of the present disclosure, in some embodiments thereof, relate to visual communication and, more particularly, but not exclusively, to methods and systems for establishing multi participant video chat.

According to some embodiments of the present disclosure, there are provided methods and systems for establishing a multi participant video session between participants where a video sequence of each one of them is captured in real time and is ready to be transmitted to other participants. In these embodiments, the actual presence of the participant in an imaged space is verified and/or a manual indication is required. For example, the method delays the initiation of the multi participant video session until presence indications are acquired from all participants.

According to some embodiments of the present disclosure, there are provided methods and systems for managing a multi participant video session between participants based on their level of participation in the multi participant video session. In such embodiment, a multi participant video session may be halt and/or terminated, when the level of participation of one of the participants decreases below a certain minimum. Optionally, the level of participation, the halting, and/or terminating, may be determined and/or adjusted according to social connections among the participants, characteristics of one of more of the participants and/or the media content that is currently watched by the participants. For brevity, halting and terminating may be referred to herein interchangeably.

Systems according to the present disclosure may be implemented by a central unit which manages the multi participant video session(s) and/or a plurality of client modules which are installed in camera enhanced client terminals, optionally as described below.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Figure 7:
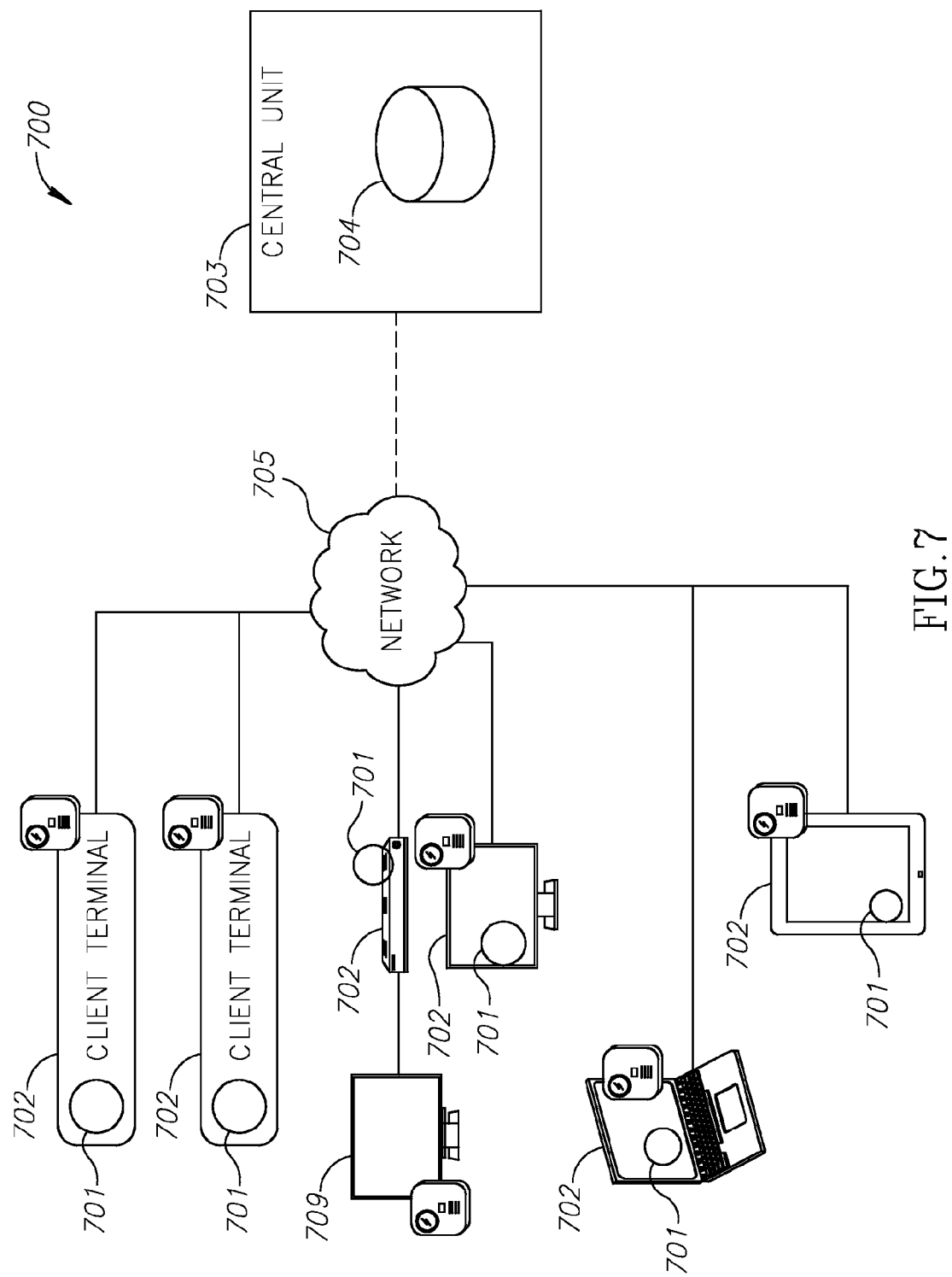
FIG. 7 is a schematic illustration of a system for establishing and/or managing a multi participant video session among participants who use camera enhanced remote client terminals, according to some embodiments of the present disclosure.

Reference is now made to FIG. 7, which is a schematic illustration of a system 700 for establishing and/or managing a plurality of multi participant video sessions each among participants who use camera enhanced remote client terminals 702 which are connected to a network 705 based on participation level of each one of the participants in the multi participant video session, according to some embodiments of the present disclosure. The participation level may be evaluated by an analysis of activity in the imaged spaces, for example in front of the camera enhanced remote client terminals 702 and/or by detecting the presence of the participants in these spaces and/or the absence of the participants from these spaces. The multi participant video session may be any communication between participants in real-time which involves the reception and/or transmission of video depicting the participants at different locations and optionally audio signals of the voice of the participants, for example a video chat, video telephony, and/or the like.

The multi participant video sessions, as further described below, may be implemented and/or managed by a central unit 703, which is optionally implemented on one or more web servers and/or a plurality of client modules 701 which are installed on the client terminals 702. During the multi participant video session, a user interface, such as a dynamic graphical user interface (GUI), is presented to each one of the participants, optionally on top of media content that is presented on the display of the respective client terminal.

It should be noted that though in the specification of this present application the multi participant video sessions are described as managed and/or processed by the central unit 703, the management and/or the processing may be performed by one or more of the client modules 701. For example, a multi participant video session is managed by the client module 701 which has been used to initiate it. In such embodiments, the communication between different client modules 701 may be performed over peer to peer connections and/or schemes.

The client module 701 may be implemented as a software component executed by the hosting client terminal 702, for example an application from an app store, an add-on, and/or a standalone application and/or a hardware component that is installed in the hosting client terminal 702, for example an integrated circuit (IC). The client terminal 702 may be a set-top-box (STB), which is connected to a screen, such as a television (TV) 709, an Internet Protocol television (IPTV), also known as a smart TV and/or Connected TV, and/or a computing unit, such as a laptop, a desktop, a Smartphone, a cellular device, a tablet and/or any other device that can be used for providing internet TV service.

Optionally, the central unit 703 is connected to the client modules 701 in each one of the client terminals 702 via the network 705, such as the Internet and/or an Ethernet and/or WLAN. In such an embodiment, the multi participant video session is managed by the central unit 703. Optionally, the central unit 703 includes and/or connected to a database 704 that allows storing and updating information pertaining to the multi participant video sessions.

Figure 8:
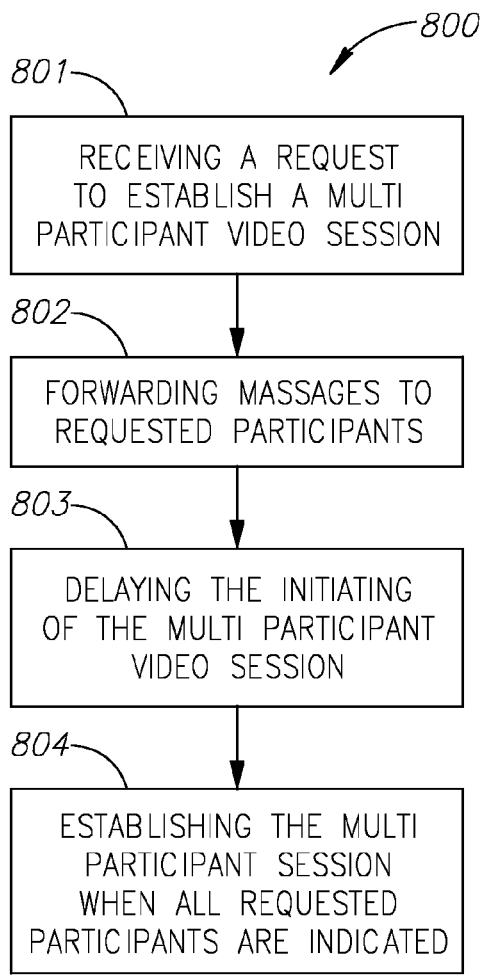
FIG. 8 is a flowchart of a method for establishing a multi participant video session, according to some embodiments of the present disclosure.

Reference is now also made to FIG. 8 which is a flowchart 800 of a method for establishing a multi participant video session, according to some embodiments of the present disclosure. The method is optionally implemented by an entity managing the multi participant video session, for example one of the client terminals 702 or the central unit 703.

First, as shown at 801, a request to establish a multi participant video session between participants via camera enabled client terminals which are connected to the network 705 is received 705. As used herein, camera enabled client terminal is a client terminal connected to and/or integrated with a camera, for example any imaging device, for example a complementary metal oxide semiconductor CMOS based sensor, a charge coupled device (CCD) based sensor, an internet camera, and/or an integrated camera or an image sensor of a client terminal. The request may be an outcome of a user selection, for example a user which clicks on an icon indicative of a multi participant video session and/or one or more requested participants from a list that is presented on the display of his camera enabled client terminal 702. The requests are optionally received via the network 705 from the client modules 701. Each request may define the identity of the participants who should participate in the established multi participant video session. Optionally, as shown at 802, one or more messages which include a request to join the multi participant video session are forwarded to the camera enabled client terminals of the requested participants, for example as network messages.

Now, as shown at 803, the initiation of the multi participant video session is delayed until a presence indication and/or a participation level indication indicative of a presence of one of the participants in an imaged space, for example in front of a camera enabled client terminal is received from each one of the camera enabled client terminals to which a request has been sent.

The presence indication and/or the participation level indication are optionally received from the client module 701. Optionally, the forwarding of the indication to a managing entity, such as the central unit 703, is performed in response to a user selection, for example in response to a user clicking on a button indicative of accepting a request to join a multi participant video session.

Optionally, the forwarding of the presence indication to the managing entity is performed in response to an automatic detection of a presence of a participant in front of the camera of the respective camera enabled client terminal 702. For example, each client module 701, which receives a request to join a multi participant video session, captures a sequence of images using the respective camera and processes the image to detect the presence of the requested participant or any other potential participant in front of the camera enabled client terminal 702 and/or in any other imaged space. For example, a face detection algorithm is used to detect a face in front of the camera enabled client terminal 702, for example see Yao-Jiunn Chen, Simple Face-detection Algorithm Based on Minimum Facial Features, the 33rd Annual Conference of the IEEE Industrial Electronics Society (IECON) Nov. 5-8, 2007, Taipei, Taiwan, which is incorporated herein by reference. In another embodiment, the presence of the face of a particular requested participant in the captured image sequence is detected. For example, a face recognition algorithm is used to determine whether the face of the requested participant is in an imaged space, for example in front of the camera enabled client terminal 702 or not. In such an embodiment, data pertaining to facial features of the participant and/or a reference image thereof are stored, optionally on the respective client terminal, and/or sent with the request, to allow identifying that the face in the image sequence are of the requested participant. For example, see H. Schneiderman, T. Kanade. "A Statistical Method for 3D Object Detection Applied to Faces and Cars", IEEE Conference on Computer Vision and Pattern Recognition (CVPR 2000) and Paul Viola, et. al., Robust Real-Time Face Detection, International Journal of Computer Vision 57(2), 137-154, 2004, which are incorporated herein by reference.

Now, as shown at 804, a multi participant video session is established between the requested participants via the camera enabled client terminals after presence indications are received from all the requested participants. In such a manner, none of the participants is imaged without giving his consent to participate in the multi participant video session. When the multi participant video session is established, a video sequence captured by each one of the camera enabled client terminals is forwarded to be presented on displays of some or all of the other camera enabled client terminals which are used for the multi participant video session. This video sequence is not displayed when the multi participant video session is delayed. As the multi participant video session is established only when all the participants are actually present in imaged spaces, for example in front of the camera enabled client terminals and therefore imaged, the method assures reciprocal exposure among the participants. That is to say that a first participant may be displayed with a live image of a second participant if and only if the second participant sees the first participant.

Figure 9:
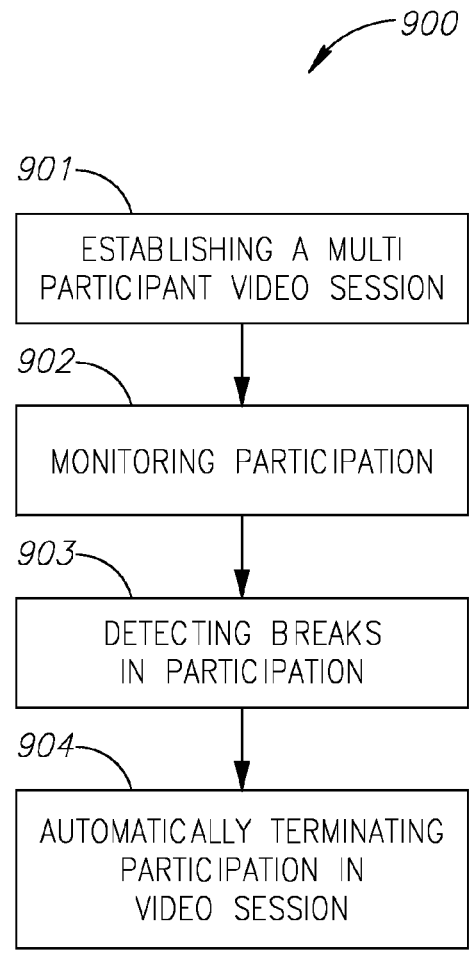
FIG. 9 is a flowchart of a method for managing a multi participant video session, according to some embodiments of the present disclosure.

Reference is now also made to FIG. 9 which is a flowchart 900 of a method for managing a multi participant video session, according to some embodiments of the present disclosure. After a multi participant video session is established, for example as described in FIG. 8 and depicted in 901, participation and/or participation level of some or all of the participants is monitored during multi participant video session, as shown at 902. It should be noted that participation may be considered as presence in an image space, such as the space in front of the camera enhanced client terminal, a presence with a certain level of activity, for example a level of movement and/or the frequency of speech detection, and/or a period of presence with an active rule in the multi participant video session. Optionally, the level of participation that is required from each participant may be defined by him, for example using a GUI that is presented thereto. For example, the participation may be set according to the level of privacy of the participant. A high level of privacy may require active participation in the multi participant video session and a low level of privacy may require presence only.

The monitoring of participation or a participation level of a participant is optionally performed by analyzing an image sequence that is captured by the respective camera enhanced client terminal. In such embodiments, the respective client module 702 may perform an image processing analysis, for example based on any of the face detection and/or recognition algorithms which are described above. The detection and/or recognition of a face gazing at a display of the respective camera enhanced client terminal is indicative that a person is currently viewing the image that is presented thereto, namely an image of one or more participants of the multi participant video session. This may be considered as an active participation in the multi participant video session. Optionally, if the eyes of the imaged face are closed and/or if the person that not look at the display for a certain period, an indication of luck of participation is received. As further described below, this may lead to the termination of the multi participant video session or the participation of the respective participant in the multi participant video session.

Additionally or alternatively, the participation of each participant is optionally monitored by analyzing an audio sequence that is captured by the camera enhanced client terminal 702. For example, a speech analysis is made to detect whether the participant talks during the multi participant video session. The speech analysis is optionally continuous along the monitoring period so as to determine whether the participant takes an active part in the multi participant video session or not. Optionally, speech patterns are analyzed to determine if the participant talks with person(s) who do not take part in the multi participant video session. Such speech patterns are optionally indicative that the participant does not participate actively in the multi participant video session.

The participation monitoring allows detecting breaks in the participation of participants of the multi participant video session, for example as shown at 903. For example, a break of more than a certain period, for example 1 minute, 5 minutes, 15 minutes or any intermediate or longer period is detected according to an analysis of video and/or audio sequences. The break is detected when no participation or sparse participation is identified during a certain period. As used herein, a sparse participation means a detection of a participation for less than a minimal period, for example a participation for an interval of less than 1 minute, optionally during a monitoring period of more than a certain interval, for example more than 10 minutes.

As shown at 904, when a break is detected, the multi participant video session or the participation of the respective participant in the multi participant video session may be automatically terminated or a notification pertaining to the multi participant video session may be sent to the respective participant(s). For example, the sent notification is presented on the display and facilitates the participant to select whether she wants to participate with the multi participant video session or not. Optionally, if not answer is received, the multi participant video session or the participation of the participant is terminated. In another example, the multi participant video session is automatically put on hold, requesting some or all of the participants to reauthorize the resuming thereof. If no break is detected, the multi participant video session continues until it ends by one or all of the participants.

As the multi participant video session is terminated and/or put on hold when one or more of the participants do not take active part in the participation, the method reduces the timeslot during which a certain participant may be exposed to images of a another participant which are taken when the other participant did not notice.

Optionally, the management of the multi participant video session is determined according to the classification of the participants. In such an embodiment, social connections among participants may be extracted from a social network and/or a database mapping social connections among a plurality of users, such as subscribers. For example, if not all the participants are socially connected, the multi participant video session may be terminated automatically after a break of one minute; however, if all the participants are socially connected, a notification asking a non active participant to confirm his will to participate in the multi participant video session is displayed. Participants may also be classified according to one or more characteristics thereof, for example demographic characteristics which are taken from the participants' profiles.

As described above, the camera enhanced client terminal is optionally a television, an IPTV, a set-top-box or any other devices that is set to display media content in parallel to the conducting of the multi participant video session. Optionally, the management of the multi participant video session is determined according to which media content is currently presented on a display of the camera enhanced client terminals of the participants. This media content may be broadcasted, streamed and/or locally stored on the client terminal or on a database which is accessed by it. For example, if the media content, which is displayed on the client terminals 702 of the participants, is of a certain type, such as a football match, then the break period which induces a termination of the multi participant video session is increased, for example from a default of 5 min to 15 min. In another example, the multi participant video session is put on hold when the user zaps from one channel to another, pauses the content media, and/or otherwise performs an action which indicates that the content she is watching is not synchronized with the content other participants are watching.

It is expected that during the life of a patent maturing from this application many relevant methods and systems will be developed and the scope of the term a client terminal, a central unit, a network and a message is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A method for managing a multi-participant session, comprising:

establishing a multi-participant session among a plurality of subscribers on a plurality of client terminals using at least one server connected to a network, wherein said multi-participant session establishes network communication of at least one of video signals, audio signals, and signals of a social interactive activity of said plurality of subscribers between said plurality of client terminals used by said plurality of subscribers;

capturing a plurality of image sequences, wherein each one of said plurality of image sequences is captured using a camera of one of said plurality of client terminals which are connected to said network;

automatically detecting a change in a participation level of one of said plurality of subscribers in said multi-participant session by performing an analysis of said plurality of image sequences, wherein, depending on a genre of media content being presented to said plurality of subscribers, said automatically detecting said change in participation level comprises identifying sparse participation by detecting participation for less than a minimal participation period during a monitoring period of time more than a certain interval of time, said monitoring period of time is modified from a default period to another based on said genre of said media content being presented, wherein said certain interval of time is greater than said minimal participation period;

in response to said detected change automatically executing one of: (i) terminating a participation of said one of said plurality of subscribers in said multi-participant session by ending said network communication between a client terminal of said one of said plurality of subscribers and other client terminals of said plurality of client terminals, and (ii) terminating the multi-participant session by ending said network communication between all of said plurality of client terminals, wherein each subscriber of the plurality of subscribers participates in said multi-participant session using his own respective client terminal; and extracting social connections among said plurality of subscribers from a social network database mapping social connections among a plurality of users, wherein said one of (i) terminating said participation of said one of said plurality of subscribers and (ii) terminating said multi-participant session is based on an amount of said plurality of subscribers that are socially connected according to said extracted social connections of said plurality of subscribers of said established multi-participant session, wherein said (ii) termination of said multi-participant session is further based on an active/ inactive status of at least one of said plurality of subscribers of said established multi-participant session that are socially connected according to said extracted social connection.

2. The method of claim 1, wherein said automatically detecting comprises detecting presence of a face in one of said plurality of image sequences.

3. The method of claim 1, wherein said automatically detecting comprises detecting absence of a face in one of said plurality of image sequences.

4. The method of claim 1, wherein said automatically detecting comprises detecting closed eyes of at least one of said plurality of subscribers.

5. The method of claim 1, wherein said automatically detecting comprises detecting talking activity of at least one of said plurality of subscribers with a person which is not one of said plurality of subscribers.

6. The method of claim 1, wherein said doing one of terminating a participation of said one of said plurality of subscribers in said multi-participant session and terminating the multi-participant session is performed when said participation level is below a minimal level.

7. The method of claim 1, further comprising identifying a type of content of a media content currently displayed on at least one of said plurality of client terminals, wherein said automatically detecting is based on said identified type.

8. The method of claim 1, further comprising identifying at least one characteristic of at least one of said plurality of subscribers, wherein said automatically detecting is based on said identified at least one characteristic.

9. The method of claim 1, wherein said plurality of client terminals includes at least one internet protocol television (IPTV).

10. The method of claim 1, wherein said plurality of client terminals includes at least one set top box.

11. A computer readable non-transitory medium comprising computer executable instructions to perform the method of claim 1.

12. A system for managing a multi-participant session, comprising:
a plurality of client modules installed in a plurality of client terminals which are connected to a network;
at least one server having a hardware processor which executes code instructions for:
establishing a multi-participant session among a plurality of subscribers who use said plurality of client terminals, wherein said multi-participant session establishes network communication of at least one of video signals, audio signals, and signals of a social interactive activity of said plurality of subscribers between said plurality of client terminals used by said plurality of subscribers;
receiving a plurality of image sequences each captured by a camera connected to one of said plurality of client terminals;
automatically detecting a change in a participation level of one of said plurality of subscribers by performing an analysis of said plurality of image sequences,
wherein, depending on a genre of media content being presented to said plurality of subscribers, said automatically detecting said change in participation level comprises identifying sparse participation by detecting participation for less than a minimal participation period during a monitoring period of time more than a certain interval of time, said monitoring period of time is modified from a default period to another based on said genre of said media content being presented, wherein said certain interval of time is greater than said minimal participation period;
in response to said detected change automatically executing one of: (i) terminating a participation of said one of said plurality of subscribers in said multi-participant session by ending said network communication between a client terminal of said one of said plurality of subscribers and other client terminals of said plurality of client terminals, and (ii) terminating the multi-participant session by ending said network communication between all of said plurality of client terminals,
wherein each subscriber of the plurality of subscribers participates in said multi-participant session using his own respective client terminal; and
extracting social connections among said plurality of subscribers from a social network database mapping social connections among a plurality of users, wherein said one of (i) terminating said participation of said one of said plurality of subscribers and (ii) terminating said multi-participant session is based on an amount of said plurality of subscribers that are socially connected according to said extracted social connections of said plurality of subscribers of said established multi-participant session, wherein said (ii) termination of said multi-participant session is further based on an active/inactive status of at least one of said plurality of subscribers of said established multi-participant session that are socially connected according to said extracted social connection.

13. A non-transitory computer readable storage medium for managing a multi-participant session comprising instructions stored thereon, that when executed on a processor of at least one server connected to a network for establishing a multi-participant session among a plurality of subscribers who use a plurality of client terminals connected to said network, said multi-participant session establishing network communication of at least one of video signals, audio signals, and signals of a social interactive activity of said plurality of subscribers between said plurality of client terminals used by said plurality of subscribers, perform the steps of:
receiving a plurality of image sequences each taken by a camera connected to one of said plurality of client terminals;
automatically detecting a change in a participation level of one of said plurality of subscribers in said multi-participant session by performing an analysis of said plurality of image sequences, wherein said multi-participant session includes communication between said plurality of subscribers,
wherein, depending on a genre of media content being presented to said plurality of subscribers, said automatically detecting said change in participation level comprises identifying sparse participation by detecting participation for less than a minimal participation period during a monitoring period of time more than a certain interval of time, said monitoring period of time is modified from a default period to another based on said genre of said media content being presented, wherein said certain interval of time is greater than said minimal participation period;
in response to said detected change automatically executing one of: (i) terminating a participation of said one of said plurality of subscribers in said multi-participant session by ending said network communication between a client terminal of said one of said plurality of subscribers and other client terminals of said plurality of client terminals, and (ii) terminating the multi-participant session by ending said network communication between all of said plurality of client terminals, wherein each subscriber of the plurality of subscribers participates in said multi-participant session using his own respective client terminal; and extracting social connections among said plurality of subscribers from a social network database mapping social connections among a plurality of users, wherein said one of (i) terminating said participation of said one of said plurality of subscribers and (ii) terminating said multi-participant session is based on an amount of said subscribers that are socially connected according to said extracted social connections of said plurality of subscribers of said established multi-participant session, wherein said (ii) termination of said multi-participant session is further based on an active/inactive status of at least one of said plurality of subscribers of said established multi-participant session that are socially connected according to said extracted social connection.

\* \* \* \* \*